(12) United States Patent
Iwasaki

(10) Patent No.: US 7,868,970 B2
(45) Date of Patent: Jan. 11, 2011

(54) LIGHT GUIDE PLATE, AS WELL AS A PLANAR LIGHTING DEVICE AND LIQUID CRYSTAL DISPLAY APPARATUS USING THE SAME

(75) Inventor: Osamu Iwasaki, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 917 days.

(21) Appl. No.: 11/667,246

(22) PCT Filed: Nov. 9, 2005

(86) PCT No.: PCT/JP2005/020525
§ 371 (c)(1),
(2), (4) Date: May 8, 2007

(87) PCT Pub. No.: WO2006/051809
PCT Pub. Date: May 18, 2006

(65) Prior Publication Data
US 2007/0279549 A1  Dec. 6, 2007

(30) Foreign Application Priority Data
Nov. 9, 2004  (JP) .............................. 2004-325251

(51) Int. Cl.
*G02F 1/1335* (2006.01)
*F21V 8/00* (2006.01)
(52) U.S. Cl. ............................. 349/64; 349/56; 349/62; 362/616; 362/617; 362/97.1; 362/97.2
(58) Field of Classification Search .................. 349/64, 349/56, 58, 61, 62, 65, 66; 362/616, 617, 362/606, 97.1, 97.2; 385/129, 130, 14
See application file for complete search history.

(56) References Cited

U.S. PATENT DOCUMENTS

| | | | |
|---|---|---|---|
| 5,940,571 A | * | 8/1999 | Masaki ..................... 385/146 |
| 7,452,120 B2 | * | 11/2008 | Lee et al. ..................... 362/627 |
| 2004/0174717 A1 | | 9/2004 | Adachi et al. |

(Continued)

FOREIGN PATENT DOCUMENTS

JP  5-4133 U  1/1993

(Continued)

OTHER PUBLICATIONS

EP Communication, dated Feb. 17, 2010, issued in corresponding EP Application No. 05806155.7, 6 pages.

*Primary Examiner*—Brian M Healy
(74) *Attorney, Agent, or Firm*—Sughrue Mion, PLLC

(57) ABSTRACT

In order to provide a larger-sized light guide plate that is thin and lightweight and allows more uniform, less uneven and higher-luminance illuminating light to emit from a light exit surface, a sectional shape of each back surface of the rectangular light exit surface satisfies the following 10th-order function formula. X is a position from the origin in a direction parallel to the one side of the light guide plate, and Y is a position from the origin in a direction perpendicular to the one side. $Y=A_0+A_1\times X+A_2\times X^2+A_3\times X^3+A_4\times X^4+A_5\times X^5+A_6\times X^6+A_7\times X^7+A_8\times X^8+A_9\times X^9+A_{10}\times X^{10}$, $-1.3\times10^5 \leq A_0 \leq 2.4\times10^5$, $-2.0\times10^4 \leq A_1 \leq 9.4\times10^4$, $-2.6\times10^4 \leq A_2 \leq 5.7\times10^4$, $-5.5\times10^3 \leq A_3 \leq 2.2\times10^3$, $-2.1\times10^2 \leq A_4 \leq 1.1\times10^2$, $-3.7\times10 \leq A_5 \leq 2.2\times10$, $-1.4\times10 \leq A_6 \leq 3.3\times10$, $-3.6 \leq A_7 \leq 1.5$, $-7.8\times10^{-2} \leq A_8 \leq 3.3\times10^{-2}$, $-1.2\times10^{-2} \leq A_9 \leq 3.2\times10^{-2}$, $-1.4\times10^{-3} \leq A_{10} \leq 4.9\times10^{-4}$. A planar lighting device includes the light guide plate, and a liquid crystal display apparatus includes the planar lighting device as a backlight unit.

14 Claims, 15 Drawing Sheets

U.S. PATENT DOCUMENTS

| | | | |
|---|---|---|---|
| 2007/0223247 A1* | 9/2007 | Lee et al. | 362/606 |
| 2007/0279549 A1* | 12/2007 | Iwasaki | 349/64 |
| 2008/0137004 A1* | 6/2008 | Iwasaki et al. | 349/64 |
| 2010/0046204 A1* | 2/2010 | Shinkai et al. | 362/97.1 |

FOREIGN PATENT DOCUMENTS

| | | |
|---|---|---|
| JP | 5-249320 A | 9/1993 |
| JP | 8-62426 A | 3/1996 |
| JP | 08-320489 A | 12/1996 |
| JP | 9-304623 A | 11/1997 |
| JP | 10-82915 A | 3/1998 |
| JP | 10-133027 A | 5/1998 |
| JP | 2001-42327 A | 2/2001 |
| JP | 2004-12591 A | 1/2004 |
| JP | 2004-022344 A | 1/2004 |
| JP | 2004-302067 A | 10/2004 |
| WO | 2005/080863 A2 | 9/2005 |

* cited by examiner

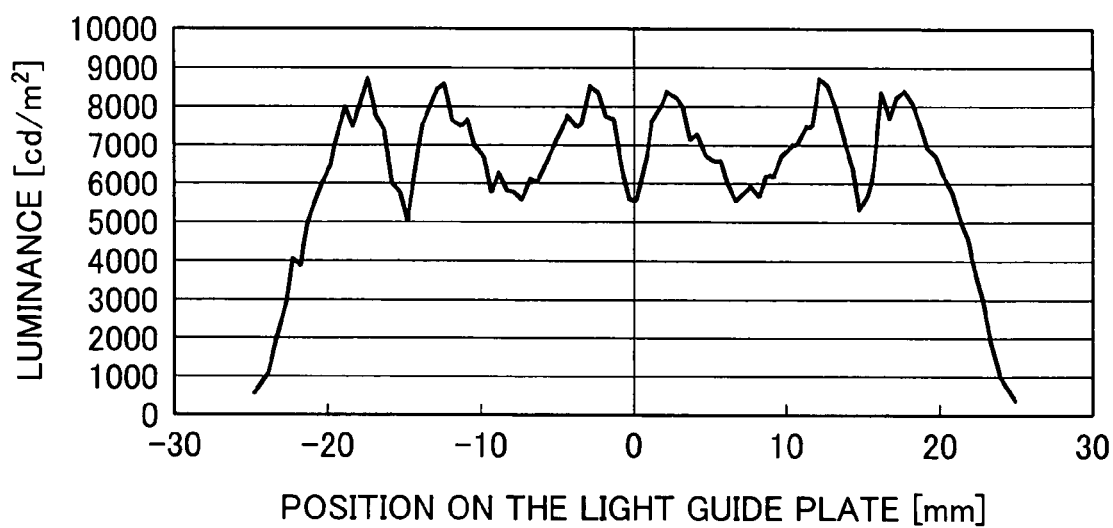

FIG.22
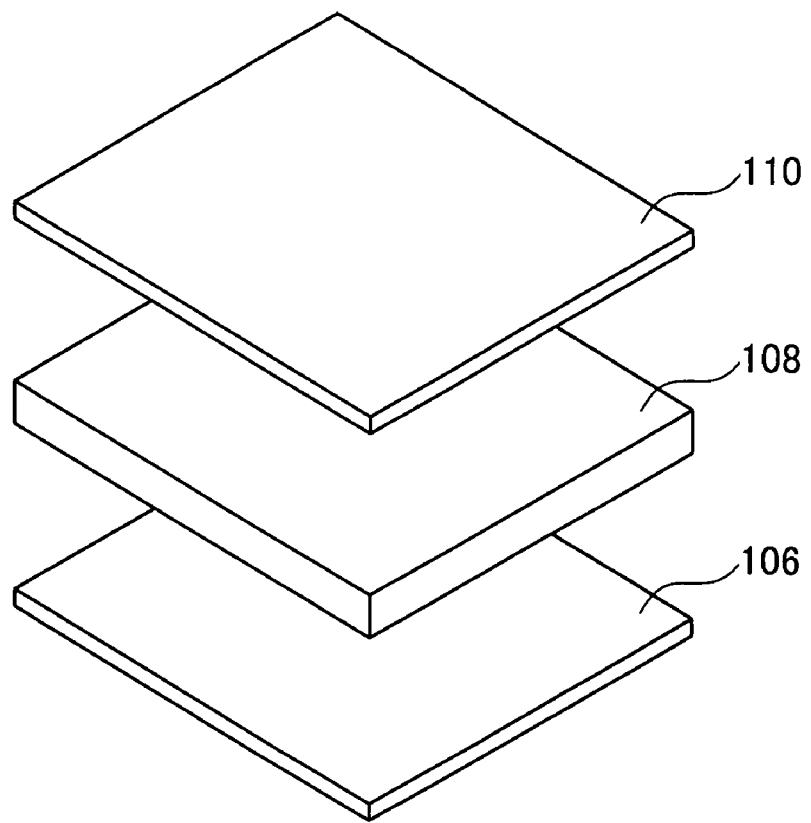
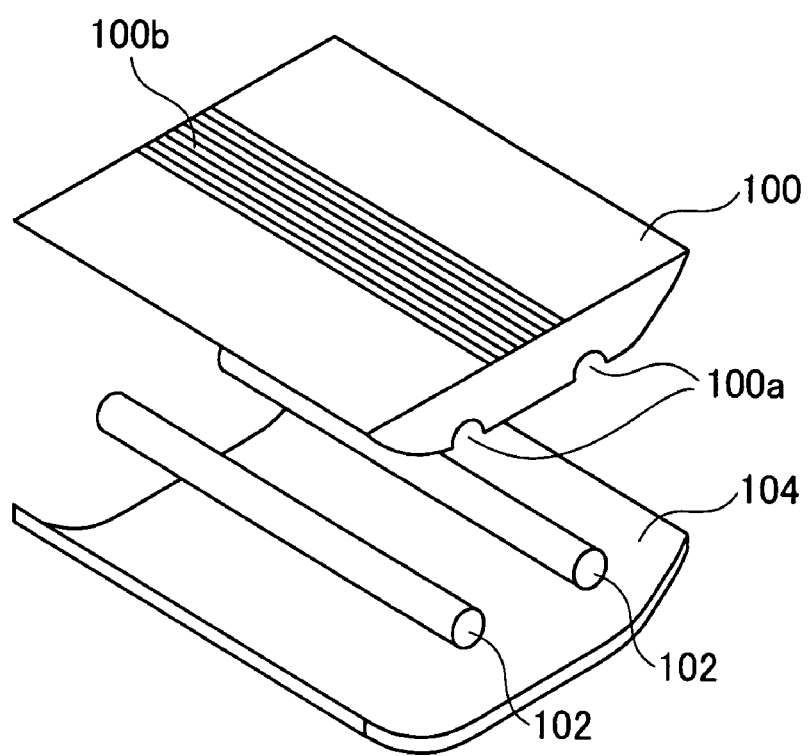

LIGHT GUIDE PLATE, AS WELL AS A PLANAR LIGHTING DEVICE AND LIQUID CRYSTAL DISPLAY APPARATUS USING THE SAME

TECHNICAL FIELD

The present invention relates to a transparent light guide plate that causes light coming from a rod of light source to diffuse in a direction of plane so that more uniform illuminating light will emit from a light exit surface, as well as a planar lighting device and a liquid crystal display apparatus that use the same.

BACKGROUND ART

A liquid crystal display apparatus is provided with a backlight unit for irradiating a liquid crystal panel (LCD) with light from its rear side and illuminating the liquid crystal panel. The backlight unit comprises an illuminating light source, a light guide plate that causes light emitted from the light source to diffuse for irradiating the liquid crystal panel, a prism sheet or diffuser sheet by which the light radiated from the light guide plate is made uniform, and other such components.

The backlight unit in most of the current big-screen liquid crystal TV sets is of a so-called "direct illumination" type which has a light guide plate provided directly above an illuminating light source, as disclosed in Patent Document 1. In this type of backlight light, a plurality of cold-cathode tubes working as light sources are provided on a rear surface of a liquid crystal panel and the interior is made of white reflecting surfaces to ensure a uniform distribution of light quantity and the required luminance. However, this type of backlight unit, in principle, requires that the liquid crystal panel have a thickness of about 30 mm in a vertical direction in order to provide a uniform distribution of light quantity.

In recent years, liquid crystal display apparatuses are required to be thinner and consume less power while having a bigger screen; however, the effort toward smaller thickness has been limited in the above-described "direct illumination" type of backlight unit because unevenness in the quantity of light occurs if the thickness of the light guide plate is made smaller than 10 mm. In order to meet those demands of liquid crystal display apparatuses for smaller thickness, lower power consumption and bigger screen, light guide plates of various shapes have been proposed (see Patent Documents 2, 3, 4, 5, and 6).

FIG. 22 is an expanded perspective view that shows an outline of an area light source device having the light guide plate disclosed in Patent Document 2.

The area light source device (backlight unit) shown in FIG. 22 is formed by embedding fluorescent lamps 102 in a light guide plate 100, then providing a reflective sheet 104 on the back surface of the light guide plate 100 and placing a transmitted light quantity correcting sheet 106, a light diffuser 108, and a prism sheet 110 in superposition on an exit surface of the light guide plate 100.

The light guide plate 100 has a generally rectangular shape and is made of a resin into which fine particles that diffuse illuminating light are dispersed. Also, the light guide plate 100 has a flat upper surface, which is used as the exit surface. Further, grooves 100a each having a U sectional shape and into which the fluorescent lamps 102 are to be fitted are formed in the back surface (surface opposite to the exit surface) of the light guide plate 100, and a light quantity correcting surface 100b for promoting the emission of illuminating light is formed on the exit surface of the light guide plate 100, except in portions directly above the fluorescent lamps 102.

Thus, according to Patent Document 1, the fine particles are mixed into the resin to form the light guide plate 100 and in addition, the emission of illuminating light is promoted by the light quantity correcting surface 100b formed on a part or all of the exit surface except in the portions directly above the fluorescent lamps 102, thus making it possible to reduce the total thickness as well as the unnatural unevenness in luminance of the emitted light.

In addition, Patent Document 3 discloses a light guide plate which, for the purpose of obtaining a backlight for a liquid crystal display apparatus that is not reduced in the quantity of light it irradiates and which yet is capable of reducing the size, weight, thickness, cost and power consumption of the liquid crystal display apparatus, has a rectangular irradiating surface, a groove rectangular in section which is gouged out at a central portion with respect to the short sides in parallel with the long sides and in which a light source is to be inserted, and a back surface formed such that the plate thickness is gradually reduced from the groove toward both lateral surfaces on the long sides.

In addition, Patent Document 4 discloses a light guide member (light guide plate) which, for the purpose of obtaining a backlight unit that enables a liquid crystal display apparatus to have a narrower frame and a smaller thickness and which is bright with high utilization of light, has a recess into which a light source is to be provided and whose sectional shape as taken parallel to the direction of its width is a parabola having a major axis that extends in the direction of its depth.

Further in addition, Patent Document 5 discloses a light guide plate which, for the purpose of maintaining uniform brightness in a plane of a display panel to achieve illumination of high luminance, has a plurality of optical waveguide layers superposed on top of a generally V-shaped, highly reflective layer in such a way that their refractive indices increase sequentially to ensure that a light diffusing layer is made brighter by means of light emitting from the light exit surface of each optical waveguide layer. The recess in which a light source is to be provided has a triangular shape.

The light guide plates disclosed in the patent documents listed above are designed to fulfill some of the needs of liquid crystal display apparatuses, such as smaller thickness, miniaturization and weight reduction, lower power consumption, and lower cost; however, each of them is so adapted that one or more grooves are provided in the central part, with a rod of light source being fitted in each groove, with the sheet thickness being preferably rendered to decrease gradually from the groove toward an end face on either side, thereby successfully reducing the thickness of the liquid crystal display apparatus.

In addition, Patent Document 6 describes a liquid crystal backlight adapted for use on a big, liquid crystal display screen in a wall-hung TV set, in which a plurality of light guide plates are arranged side by side, with a predetermined number of linear light sources being provided such that each one is between adjacent guide plates, thereby providing high enough luminance to achieve highly uniform illumination of the back surface covering a wide area.

PATENT DOCUMENT 1: JU 5-4133 A

PATENT DOCUMENT 2: JP 9-304623 A

PATENT DOCUMENT 3: JP 8-62426 A

PATENT DOCUMENT 4: JP 10-133027 A

PATENT DOCUMENT 5: JP 5-249320 A

PATENT DOCUMENT 6: JP 2001-42327 A

DISCLOSURE OF THE INVENTION

Problems to be Solved by the Invention

The light guide plate 100 disclosed in Patent Document 2 and shown in FIG. 22 is such that the light quantity correcting surface 100b as exemplified by a roughened surface or a micro-prism surface is formed on the exit surface's side, except in areas directly above the light sources (fluorescent lamps) 102, thereby to promote the emission of the illuminating light incident on the exit surface at angles greater than the critical angle. However, as FIG. 23 shows, the luminance N2 of the illuminating light from the light guide plate 100 having the light quantity correcting surface 100b (which luminance is shown by the solid line shown by the dashed line) is improved only a little in comparison with the luminance N1 of the illuminating light from a light guide plate that does not have any light quantity correcting surface (which luminance is shown by the dashed line), so the light quantity correcting surface 100b is not greatly effective in improving luminance and this causes the following problem: the utilization of the light from the light source is so low that its diffusion is insufficient for the exit surface to emit uniform and high-luminance light.

In addition, the light guide plate 100 shown in FIG. 22 has the light sources (fluorescent lamps) 102 embedded in the grooves 100a whose sectional shape is circular and, as FIG. 23 shows, the luminance peaks due to the light sources 102 remain as they are; therefore, in order that the light guide plate is used as an area light source device, the transmitted light quantity correcting sheet 106, the light diffuser 108, the prism sheet 110 and the like must be provided on the exit side of the light guide plate so as to remove any unnatural unevenness in luminance on the exit surface, but then this causes the problem of increasing the cost of the area light source device.

In addition, in the backlight for a liquid crystal display apparatus that is disclosed in Patent Document 3, components on an electronic circuit board are provided in gaps created by inclining the back surface of the light guide plate and, as a result, the cost and power consumption are reduced while achieving a compact, lighter and thinner liquid crystal display apparatus. However, Patent Document 3 considers nothing about the possible unevenness that might occur in the illuminating light that emits from the exit surface of the light guide plate.

In addition, describing the backlight unit for a liquid crystal display apparatus it discloses, Patent Document 4 claims that by rendering the groove-shaped recess in the light guide member (light guide plate) to have a parabolic sectional shape, light can be launched into the light guide member such that it will diffuse within the latter in a substantially uniform way to achieve enhanced utilization of the light. However, Patent Document 4 considers nothing about the possible unevenness that might occur in the illuminating light that emerges from the exit surface of the light guide member.

In addition, describing the light guide plate it discloses, Patent Document 5 claims that since it has a complex structure in which a plurality of optical waveguide sheets in plate form are placed in superposition, the attenuation in luminance can be made smaller than in the prior art, making it possible to achieve uniform luminance and, hence, more effective illumination. However, the light guide plate of Patent Document 5 suffers the problem of increased production cost.

In addition, the light guide plate disclosed in Patent Document 6 has luminance elevated in the areas directly above the linear light sources, so there is a need to provide a transmission suppressing pattern that suppresses the transmission of the light from each linear light source; furthermore, the light from each linear light source that is launched into one light guide plate is transmitted in an in-plane direction from one end portion to the other, so its quantity will attenuate progressively to an insufficient level for the purpose of achieving higher luminance.

A first object of the present invention is to solve the aforementioned problems of the prior art and provide a light guide plate that is thin and lightweight and plural units of which can be arranged side by side, yet allowing more uniform, less uneven and higher-luminance illuminating light to emit from the light exit surface in higher efficiency.

In addition to the above-stated first object, the present invention also aims to provide a light guide plate that can realize a larger-sized light exit surface.

In addition, a second object of the present invention is to solve the aforementioned problems of the prior art and provide a planar lighting device that is thinner and lighter than the "direct illumination" type, that can be manufactured at lower cost, that can achieve more uniform, less uneven and higher-luminance illuminating light, and which can realize a larger-sized illuminating surface or which can be applied in a liquid crystal display apparatus such as a wall-hung TV set.

In addition, a third object of the present invention is to solve the aforementioned problems of the prior art and provide a liquid crystal display apparatus that is thin and lightweight, that can be manufactured at lower cost, that can achieve more uniform, less uneven and higher-luminance display, and which can realize a larger-sized display screen or which can be adapted as a wall-hung type such as a wall-hung TV set.

Means for Solving the Problems

In order to solve the first object described above, a first aspect of the present invention provides a transparent light guide plate, comprising: a rectangular light exit surface that constitutes a front portion; and back surfaces that constitute a back portion and which have a shape symmetrical with respect to a symmetry plane that includes a center of the light exit surface and which is perpendicular to one side of the light exit surface, wherein the back surfaces have such a sectional profile that when a section of the light guide plate is taken through a plane that is parallel to the one side and which is perpendicular to the light exit surface and when a point at which an end face of the light guide plate is connected to one of the back surfaces is designated an origin, a position from the origin in a direction parallel to the one side is written as X, and a position from the origin in a direction perpendicular to the one side is written as Y, the sectional shape of each of the back surfaces is expressed by part of a curve that satisfies the following 10th-order function formula:

$$Y = A_0 + A_1 \times X + A_2 \times X^2 + A_3 \times X^3 + A_4 \times X^4 + A_5 \times X^5 + A_6 \times X^6 + A_7 \times X^7 + A_8 \times X^8 + A_9 \times X^9 + A_{10} \times X^{10}$$

$-1.3 \times 10^5 \leq A_0 \leq 2.4 \times 10^5$, $-2.0 \times 10^4 \leq A_1 \leq 9.4 \times 10^4$, $-2.6 \times 10^4 \leq A_2 \leq 5.7 \times 10^4$, $-5.5 \times 10^3 \leq A_3 \leq 2.2 \times 10^3$, $-2.1 \times 10^2 \leq A_4 \leq 1.1 \times 10^2$, $-3.7 \times 10 \leq A_5 \leq 2.2 \times 10$, $-1.4 \times 10 \leq A_6 \leq 3.3 \times 10$, $-3.6 \leq A_7 \leq 1.5,$ $-7.8 \times 10^{-2} \leq A_8 \leq 3.3 \times 10^{-2},$ $-1.2 \times 10^{-2} \leq A_9 \leq 3.2 \times 10^{-2},$ $-1.4 \times 10^{-3} \leq A_{10} \leq 4.9 \times 10^{-4}.$ Here, it is preferable that each of thickest portions where the light guide plate has a maximum thickness be formed between the symmetry plane and each end face of the light guide plate, and a parallel groove that tapers toward the light exit surface and which extends parallel to the symmetry plane be defined by the back surfaces that are located between the symmetry plane and the thickest portions and which are symmetrical with respect to the symmetry plane. Preferably, the parallel groove is a groove for accommodating a rod of light source.

It is also preferable that, when the rod of light source having a radius of r is accommodated in the parallel groove and if a shortest distance from a center of the rod of light source to the light guide plate is written as t, and a shortest distance, as measured in a depth direction of the light guide plate, from a plane that contacts a pair of the thickest portions to the center of the rod of light source is written as ΔH, the light guide plate satisfy t≧r, and ΔH≧r.

The sectional shape of the back surfaces is such that a curve by which a point of intersection between the curve forming one of the back surfaces and the symmetry plane is connected to one point located between the point of intersection and each of the thickest portions is preferably approximated by a straight line passing through those two points.

Or the sectional shape of the back surfaces is such that a curve by which a point of intersection between the curve forming one of the back surfaces and the symmetry plane is connected to one point located between the point of intersection and each of the thickest portions is preferably approximated by either a circular, elliptical, parabolic, or a hyperbolic curve.

Preferably, the 10th-order function is a function that has a slope of zero at the origin, and preferably, the 10th-order function has one minimum value between a position of the symmetry plane and the origin.

Preferably, coefficients in the 10th-order function are so determined that each of the thickest portions where the light guide plate has a maximum thickness is formed between the symmetry plane and each of the end faces, as well as a thickness of the light guide plate gradually decreases from each of thickest portions toward each of the end faces.

Preferably, a light guide plate comprises a plurality of the light guide plates described above, with mating end faces being coupled to each other. Or, a light guide plate preferably has such a structure that a plurality of the light guide plates described above are arranged side by side and monolithically, with mating end faces being coupled to each other.

In order to solve the second object described above, a second aspect of the present invention provides a planar lighting device, comprising: the light guide plate described above; a rod of light source accommodated in the parallel groove of the light guide plate; a reflector provided behind the rod of light source in such a way as to close the parallel groove; a reflective sheet fitted on the back surfaces of the light guide plate in an area between each of the end faces and each of the thickest portions; and a diffuser sheet provided on the rectangular light exit surface of the light guide plate.

Here, the planar lighting device further includes a prism sheet provided between the rectangular light exit surface of the light guide plate and the diffuser sheet.

In order to solve the third object described above, a third aspect of the present invention provides a liquid crystal display apparatus, comprising: a backlight unit comprising the planar lighting device described above; a liquid crystal display panel provided on a side of the backlight unit which is closer to its light exit surface; and a drive unit for driving the backlight unit and the liquid crystal display panel.

EFFECTS OF THE INVENTION

The light guide plate according to the first aspect of the present invention has its back surfaces so formed as to assume a sectional shape that satisfies the tenth-degree function formula set forth above; hence, this light guide plate can emit uniform, less uneven and high-luminance illuminating light from the light exit surface. Further, a plurality of such light guide plates may be coupled to make coupled light guide plates or a light guide plate assembly and yet it is possible to suppress the generation of bright lines at the joints.

Still further, by designing such that the sectional shape of the back surface portions which correspond to the groove in which a rod of light source is to be accommodated is tapered toward the light exit surface, the illuminance or luminance peaks on the light exit surface can be reduced to provide more uniform illuminance or luminance on the light exit surface, thereby achieving the uniformity required of the light exit surface.

In addition, by coupling a plurality of independent light guide plates of the present invention such that an end face of one light guide plate contacts the mating end face of another light guide plate to make coupled light guide plates (a light guide plate assembly) or, alternatively, by adapting a plurality of light guide plates such that they are coupled monolithically at their end faces to make coupled light guide plates, the coupled light guide plates can have a larger-sized light exit surface. With such coupled light guide plates, it is possible to suppress the generation of bright lines at the joints between adjacent light exit surfaces.

In addition, according to the second aspect of the present invention, by using the light guide plate according to the first aspect mentioned above, there can be provided a planar lighting device that is thin and lightweight, that can be manufactured at lower cost, that is suppressed in the generation of bright lines at the joints of coupled light guide plates, that can emit more uniform, less uneven and higher-luminance illuminating light, and which can realize a large-sized lighting surface or which can be applied in a liquid crystal display apparatus such as a wall-hung TV set.

In addition, according to the third aspect of the present invention, by using the planar lighting device according to the second aspect mentioned above, there can be provided a liquid crystal display apparatus that is thin and lightweight, that can be manufactured at lower cost, that is suppressed in the generation of bright lines at the joints of coupled light guide plates, that can achieve more uniform, less uneven and higher-luminance display, and which can realize a larger-sized display screen or which can be adapted as a wall-hung type such as a wall-hung TV set.

BRIEF DESCRIPTION OF THE DRAWINGS

FIG. 14 is a graph showing an exemplary luminance distribution on the light exit surface that is obtained when three light guide plates having the shape of back surfaces shown in the graph of FIG. 4 are coupled together.

FIG. 22 is an exploded perspective view showing an outline of an area light source device having a conventional light guide plate.

| LEGEND | |
| --- | --- |
| 2 | backlight unit |
| 4 | liquid crystal display panel |
| 6 | drive unit |
| 10 | liquid crystal display apparatus |
| 12 | light source |
| 14 | diffuser sheet |
| 16, 17, 19 | prism sheets |
| 18 | light guide plate |
| 18a | light exit surface |
| 18b | back surface |
| 18c | end face |
| 18d | thick-walled portion |
| 18e | thin-walled end portion |
| 18f | parallel groove |
| 18 | hone side |
| 20 | reflector |
| 22 | reflective sheet |
| 24 | reflective plate |
| 92 | half-dot pattern |
| S | symmetry plane |
| P | point of intersection |

BEST MODE FOR CARRYING OUT THE INVENTION

Hereinafter, the light guide plate of the present invention, as well as the planar lighting device and the liquid crystal display apparatus that use the same will be described in detail based on the preferred embodiments shown in the accompanying drawings.

Figure 1:
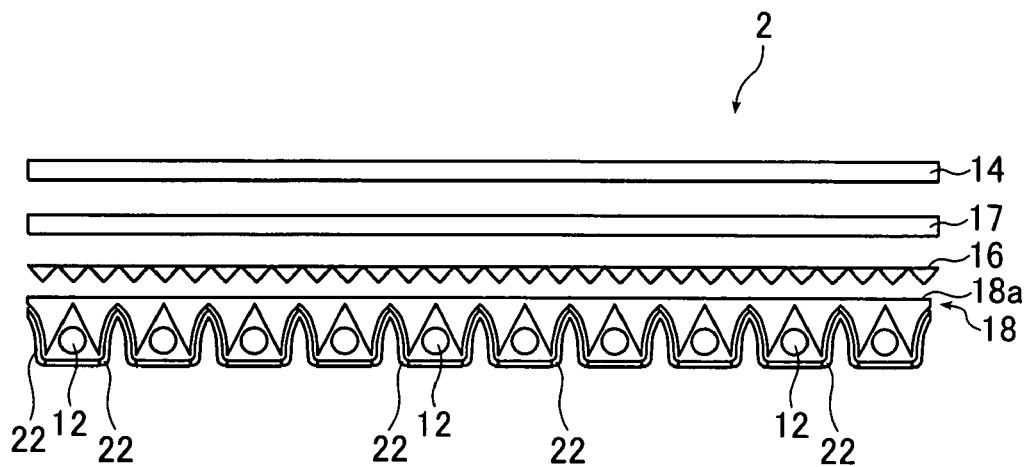
FIG. 1 is a schematic sectional view showing a structural outline of an embodiment of a planar lighting device that uses coupled light guide plates made by arranging a plurality of light guide plates of the present invention side by side.
Figure 2:
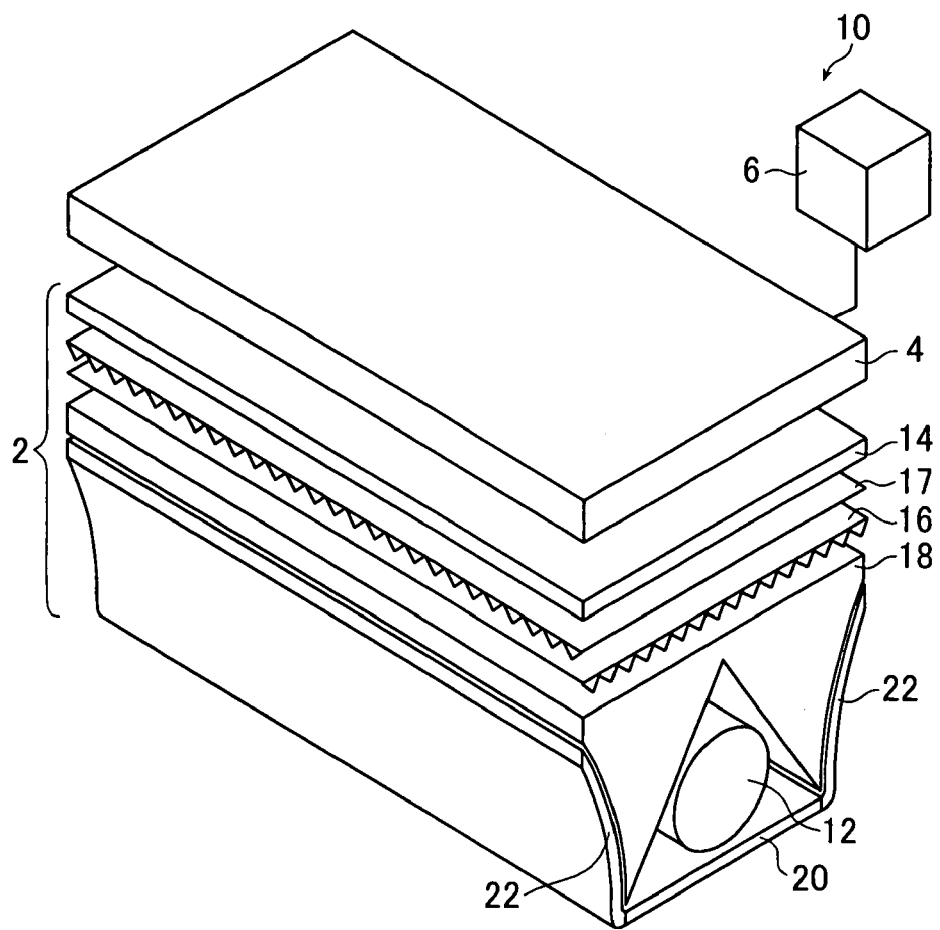
FIG. 2 is a diagrammatic perspective view of an embodiment of a liquid crystal display apparatus that uses a backlight unit having the light guide plate of the present invention.

FIG. 1 is a schematic sectional view showing a structural outline of an embodiment of the planar lighting device (hereinafter sometimes referred to as the backlight unit) according to the second aspect of the present invention that is constructed using coupled light guide plates (a light guide plate assembly) made by arranging side by side a plurality of the light guide plates according to the first aspect of the present invention. This planar lighting device is used as a backlight unit in the liquid crystal display apparatus according to the third aspect of the present invention. FIG. 2 is a diagrammatic partial perspective view of an embodiment of the liquid crystal display apparatus that is associated with one of the light guide plates in the backlight unit shown in FIG. 1. In addition, FIG. 3A is a diagrammatic partial sectional view of the liquid crystal display apparatus shown in FIG. 2, and FIG. 3B is a diagrammatic sectional view showing an embodiment of the light guide plate of the present invention used in the liquid crystal display apparatus shown in FIG. 3A, together with a rod of light source accommodated in this light guide plate.

As shown in those figures, the liquid crystal display apparatus 10 basically comprises a backlight unit 2, a liquid crystal display panel 4 provided on a side of the backlight unit 2 which is closer to its light exit surface, and a drive unit 6 for driving these components. The backlight unit 2 comprises cold-cathode tubes 12, a diffuser sheet 14, prism sheets 16 and 17, a light guide plate 18, a reflector 20, and reflective plates 22.

The backlight unit 2 is a planar lighting device for applying uniform light to the entire surface of the liquid crystal display panel 4 from its back; it has a light exit surface (light emitting surface) which is generally the same size as the image display screen of the liquid crystal display panel 4. As shown in FIG. 1, the backlight unit 2 basically comprises the light sources 12, the diffuser sheet 14, two prism sheets 16 and 17, the light guide plate 18, the reflector 20, and the reflective plates 22.

Figure 3A:
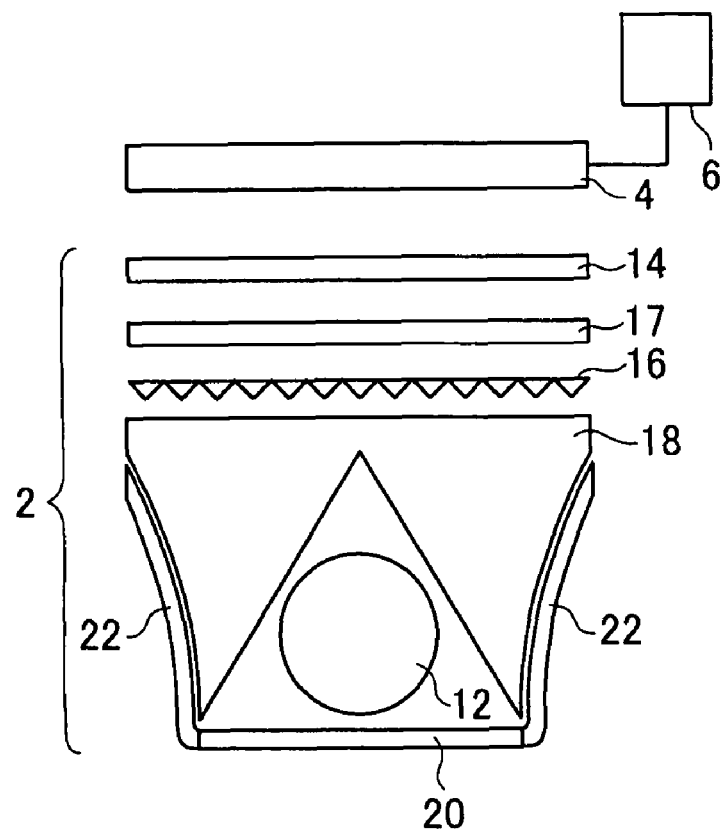
FIG. 3A is a diagrammatic sectional view of the liquid crystal display apparatus shown in FIG. 2.
Figure 3B:
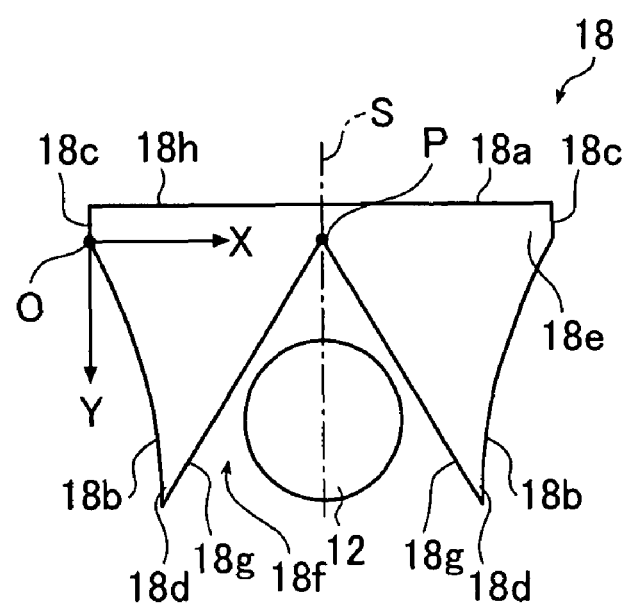
FIG. 3B is a diagrammatic sectional view showing an embodiment of the light guide plate of the present invention used in that liquid crystal display apparatus, together with a rod of light source accommodated in this light guide plate.

As shown in FIGS. 2, 3A and 3B, the light sources 12 are each a small-diameter rod of cold-cathode tube which is used to illuminate the liquid crystal display panel 4. As shown in FIG. 3B, each of the light sources 12 is provided within a parallel groove 18f formed in the light guide plate 18 and is connected to the drive unit 6 shown in FIGS. 2 and 3A. In the case under consideration, a cold-cathode tube is used as the light source 12 but this is not the sole case of the present invention and the light source 12 may be of any type as long it is a rod of light source. For example, an ordinary fluorescent tube or an LED (light emitting diode) may be used as the light source 12. To be more specific, a transparent light guide member in either a cylindrical or a prismatic form comparable in length to the parallel groove 18f in the light guide plate 18 may be provided with an LED on both of its top and bottom sides to construct an LED light source which can be substituted for the light source 12. With this LED light source, the light from the LED is admitted into the top and bottom sides of the light guide member and then allowed to emit from its lateral sides.

The light guide plate 18 shown in FIGS. 3A and 3B is a sectional outline of one of the light guide plates that make the coupled light guide plates shown in FIG. 1. As shown in FIG. 3B, the light guide plate 18 is formed of a flat rectangular light exit surface 18a that constitutes the front portion, back surfaces 18b that constitute the back portion, and end faces 18c. The back surfaces 18b have a shape symmetrical with respect to a symmetry plane S that includes the center point of the light exit surface 18a and which is perpendicular to one side 18h of the light exit surface 18a (which is a side extending from left to right in FIG. 3B). The back surfaces 18b have such a sectional profile that when a section of the light guide plate 18 is taken through a plane that is parallel to the one side 18h of the light exit surface 18a and which is perpendicular to the light exit surface 18a and when the point at which one of the back surfaces 18b is connected to the associated end face 18c is designated the origin O, the position from the origin O in a direction parallel to the one side 18h is written as X, and the position from the origin O in a direction perpendicular to the one side 18h is written as Y, the sectional shape (profile) of that back surface 18b satisfies the following 10th degree function formula (1):

$$Y = A_0 + A_1 \times X + A_2 \times X^2 + A_3 \times X^3 + A_4 \times X^4 + A_5 \times X^5 + A_6 \times X^6 + A_7 \times X^7 + A_8 \times X^8 + A_9 \times X^9 + A_{10} \times X^{10}$$

$$-1.3 \times 10^5 \leq A_0 \leq 2.4 \times 10^5,$$

$$-2.0 \times 10^4 \leq A_1 \leq 9.4 \times 10^4,$$

$$-2.6 \times 10^4 \leq A_2 \leq 5.7 \times 10^4,$$

$$-5.5 \times 10^3 \leq A_3 \leq 2.2 \times 10^3,$$

$$-2.1 \times 10^2 \leq A_4 \leq 1.1 \times 10^2,$$

$$-3.7 \times 10 \leq A_5 \leq 2.2 \times 10,$$

$$-1.4 \times 10 \leq A_6 \leq 3.3 \times 10,$$

$$-3.6 \leq A_7 \leq 1.5,$$

$$-7.8 \times 10^{-2} \leq A_8 \leq 3.3 \times 10^{-2},$$

$$-1.2 \times 10^{-2} \leq A_9 \leq 3.2 \times 10^{-2},$$

$$-1.4 \times 10^{-3} \leq A_{10} \leq 4.9 \times 10^{-4} \quad \text{Formula (1);}$$

Figure 4:
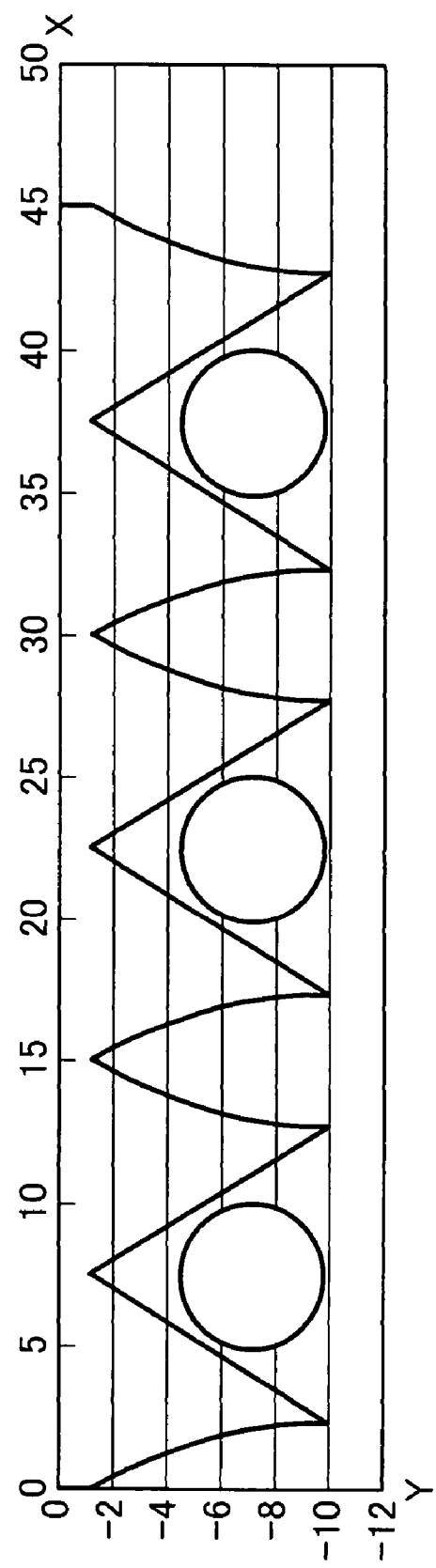
FIG. 4 is a graph showing an example of the 10th degree function formula which expresses a sectional profile of the back surfaces of the light guide plate of the present invention.

FIG. 4 is a graph of an example of the 10th degree function formula which expresses a sectional shape (sectional profile) of the back surfaces of the light guide plate of the present invention. The graph shown in FIG. 4 refers to the case where $A_0 = -1.21 \times 10^5$, $A_1 = 9.34 \times 10^4$, $A_2 = -2.53 \times 10^4$, $A_3 = 2.15 \times 10^3$, $A_4 = 1.03 \times 10^2$, $A_5 = 2.16 \times 10$, $A_6 = -1.04 \times 10$, $A_7 = 1.41$, $A_8 = 3.30 \times 10^{-2}$, $A_9 = -1.18 \times 10^{-2}$, and $A_{10} = 4.87 \times 10^{-4}$.

As shown in FIG. 3B, the light guide plate 18 of the present invention has the thick-walled portions 18d and the thin-walled edge portions 18e formed of the back surfaces 18b having the sectional shape expressed by the above-defined 10th degree function formula and of the flat light exit surface 18a. In addition, the light guide plate 18 is such that back surfaces 18g that are inward (closer to the symmetry plane) of the thickest portions where the thick-walled portions 18d are the thickest define the parallel groove 18f extending perpendicular to the one side 18h of the light exit surface 18a. As in the illustrated case, the above-described rod of light source 12 is accommodated in this parallel groove 18f.

Figure 5:
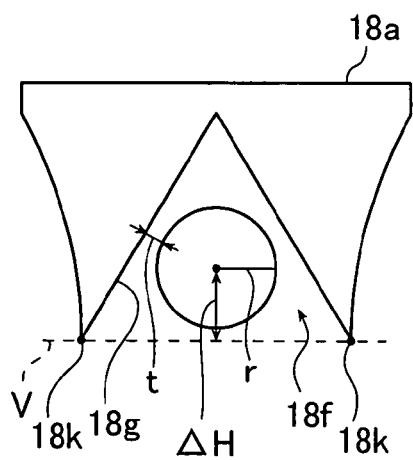
FIG. 5 is a diagram for illustrating the relationship between a parallel groove formed in the back surfaces of the light guide plate shown in FIG. 3B and the light source to be accommodated in the parallel groove.

In this case, as shown in FIG. 5, if the radius of the light source 12 is written as r and the shortest distance from the center of the light source 12 to the back surface 18g of the light guide plate 18 that defines one lateral side of the parallel groove 18f is written as t, the relation t≧r is preferably satisfied and it is preferred that the shape of the back surface portions 18g which define the parallel groove 18f in the light guide plate 18 is designed such that t>r, or that a small gap is formed between the light source 12 and each of the back surface portions 18g which define the parallel groove 18f in the light guide plate 18.

In addition, if in the direction of thickness of the light guide plate 18, the distance from the center of the light source 12 to a virtual plane V that connects a pair of the thickest back surface portions 18k where the light guide plate 18 is the thickest is written as ΔH, the relation ΔH≧r is preferably satisfied and a more preferred design is such that ΔH>r, or that the light source 12 does not contact the virtual plane V. This design for avoiding contact between the light source 12 and the virtual plane V offers the following advantage: for example, when the reflector 20 for enhancing the utilization of the light source 12 is fitted over the parallel groove 18f in the light guide plate 18 as shown in FIGS. 2 and 3A, leakage of electric current due to the light source 12 contacting the reflector 20 can be prevented. In addition, if the parallel groove 18f is formed in a shape that satisfies the range set forth above, the light source 12 can be positively accommodated within the parallel groove 18f to ensure that no part of the light source 12 will protrude from the parallel groove 18f in the light guide plate 18.

In the light guide plate 18 having the structure shown in FIGS. 3A and 3B, that part of the light emitting from the light source 12 provided in the parallel groove 18f and which is admitted into the light guide plate 18 from the back surface portions 18g that define the parallel groove 18f is reflected by the back surfaces 18b of the light guide plate 18 and emits from the light exit surface 18a. On this occasion, some light may leak form the back surfaces 18b of the light guide plate 18 but this leaking light is reflected by reflective sheets 22 formed on the back surfaces 18b of the light guide plate 18 and the reflected light is re-admitted into the light guide plate 18 and emerges from the light exit surface 18a. In the present invention, the back surfaces 18b of the light guide plate 18 are formed to have a sectional shape that is expressed by the 10th degree function defined above and this allows uniform light to radiate from the light exit surface 18a of the light guide plate 18.

In the present invention, the individual coefficients ($A_0$ to $A_{10}$) in the 10th degree function of the above-defined formula (1) which expresses the sectional shape of the back surfaces 18b of the light guide plate 18 are preferably determined such that the luminous flux emitting from the light exit surface 18a will produce a uniform distribution of light quantity. In this case, the coefficients may be so determined that the luminous flux emitting from the light source provided in one light guide plate is substantially entirely issued from the light exit surface of that light guide plate. Alternatively, in the case where a plurality of light guide plates are coupled together, the coefficients may be so determined that not all of the light emitting from the light source provided in a certain light guide plate is issued from that light guide plate but a portion of it will pass through the end faces of a light guide plate adjacent that particular light guide plate or even those of a light guide plate located farther away from it and emit from the light exit surface thereof.

With the light guide plate of the present invention, the back surfaces 18b are preferably adapted such that the slope at the connection to the associated end face 18c is zero. Adjusting the slope to zero offers the following advantage when a plurality of light guide plates 18 are coupled together as shown in FIG. 1: it is possible to suppress the generation of bright lines at the joints, or in those areas of the light exit surface 18a of the coupled light guide plates 18 which correspond to the end faces.

In the present invention, the light guide plate 18 may be produced by various methods such as, for example, extrusion or injection molding of a heated resin feed, and casting polymerization of a monomer, oligomer or the like in a mold. The material of the light guide plate 18 may be selected from among transparent resins including, acrylic resins such as PMMA (polymethyl methacrylate), PET (polyethylene terephthalate), PP (polypropylene), PC (polycarbonate), benzyl methacrylate, MS resins, other acrylic resins, or COP (cycloolefin polymer), and the like. The transparent resins may have fine particles mixed therein in order to scatter light and this contributes to further enhancing the efficiency of light emergence from the light exit surface.

The sectional shape (sectional profile) of the back surfaces 18b of the light guide plate 18 shown in FIG. 3B is further discussed. Suppose the point at which the curve forming the back surface 18g intersects with the symmetry plane S is written as P. The curve connecting this point of intersection P to any one point located between point P and the origin, namely, the curve of the portion that defines the parallel groove 18f, may be approximated by either a circular, elliptical, parabolic, hyperbolic, or a catenarian curve.

Alternatively, the portion that defines the parallel groove 18f may be realized using a curve that has an inflection point somewhere between the point of intersection P and any one point located between point P and the origin.

Figure 6:
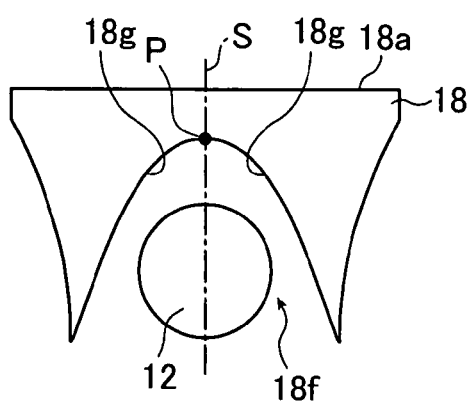
FIG. 6 is a diagrammatic sectional view showing another embodiment of the light guide plate of the present invention, in which the sectional shape of back surfaces of an area that makes the parallel groove for accommodating the rod of light source is formed of a portion of a parabolic curve that is symmetrical with respect to a symmetry plane S.
Figure 7:
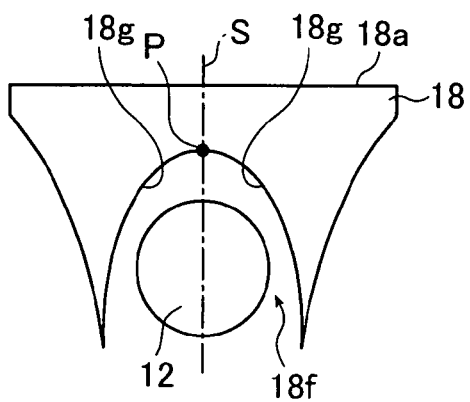
FIG. 7 is a diagrammatic sectional view showing another embodiment of the light guide plate of the present invention, in which the sectional shape of back surfaces of an area that makes the parallel groove for accommodating the rod of light source is formed of a portion of an elliptical curve that is symmetrical with respect to a symmetry plane S.
Figure 8:
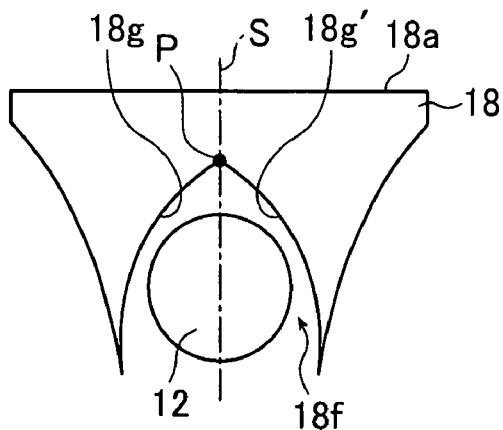
FIG. 8 is a diagrammatic sectional view showing another embodiment of the light guide plate of the present invention, in which the sectional shape of back surfaces of an area that makes the parallel groove for accommodating the rod of light source is formed of portions of a circle (arcs) that are symmetrical with respect to a symmetry plane S.

To be more specific, the light guide plate can be designed such that the sectional shape of the back surface 18g of the portion that defines the parallel groove 18f is formed of part of a parabolic curve symmetrical with respect to the symmetry plane S as shown in FIG. 6, or formed of part of an elliptical curve of the type shown in FIG. 7. Alternatively, the light guide plate can be designed such that the sectional shape of the back surface 18g of the portion that defines the parallel groove 18f is formed of part of two curves symmetrical with respect to the symmetry plane S that intersect with each other to form one sharp point of intersection P as shown in FIG. 8.

The light guide plates in which the back surface 18g of the portion that defines the parallel groove 18f has those sectional shapes can emit uniform light from their light exit surface 18a.

In addition, in the case where the light guide plate is designed such that the sectional shape of the back surface 18g of the portion that defines the parallel groove 18f is formed of part of a parabolic curve as shown in FIG. 6, it may be formed such that the parabolas corresponding to the back surfaces 18g and 18g' which are symmetrical with respect to the symmetry plane S have different foci.

In addition, the light guide plate can be designed such that the sectional shape of the back surface 18g of the portion that defines the parallel groove 18f is formed of part of circles (arcs) symmetrical with respect to the symmetry plane S. In this case, the two back surfaces 18g and 18g' symmetrical with respect to the symmetry plane S are defined by part of two circles having different centers. As a result, the area P at which the two back surfaces 18g and 18g' symmetrical with respect to the symmetry plane S intersect has a pointed shape as shown in FIG. 8.

Figure 9:
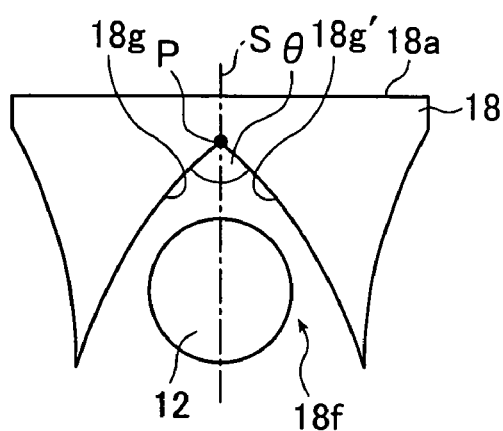
FIG. 9 is a diagrammatic sectional view showing another embodiment of the light guide plate of the present invention, in which the sectional shape of back surfaces of an area that makes the parallel groove for accommodating the rod of light source is formed of portions of a curve that are symmetrical with respect to a symmetry plane S, the diagram illustrating the angle the back surfaces form with the symmetry plane.

In addition, if, in the present invention, the light guide plate is designed such that the sectional shape of the back surface of the portion that defines its parallel groove is formed of part of curves symmetrical with respect to the symmetry plane S, the angle θ which, as shown in FIG. 9, is formed between a tangent to the one back surface 18g at the point of intersection (peak) P and a tangent to the other back surface 18g' at the point of intersection P is preferably 90 degrees or less, more preferably 60 degrees or less. Within this range, the generation of a bright line at the point P where those back surfaces intersect can be suppressed on the light exit surface 18a of the light guide plate 18 and, at the same time, when a plurality of light guide plates are connected together, the generation of bright lines at the joints can also be suppressed to ensure overall emission of uniform light.

Figure 10:
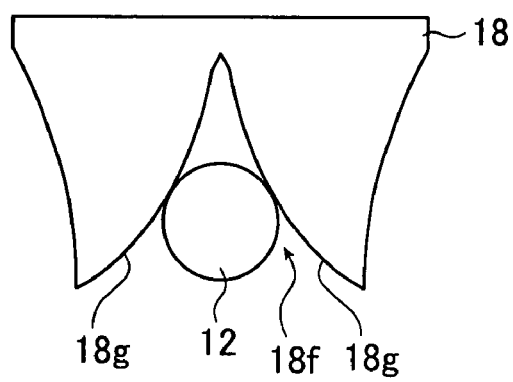
FIG. 10 is a diagrammatic sectional view showing another embodiment of the light guide plate of the present invention, in which the sectional shape of back surfaces of an area that makes the parallel groove for accommodating the rod of light source is formed of curves that are convex toward a symmetry plane S.
Figure 11:
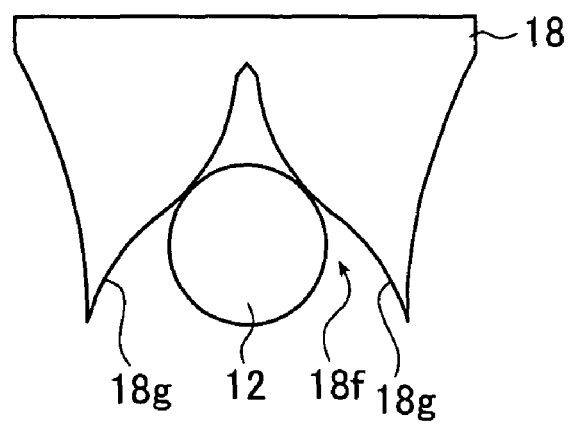
FIG. 11 is a diagrammatic sectional view showing another embodiment of the light guide plate of the present invention, in which the sectional shape of back surfaces of an area that makes the parallel groove for accommodating the rod of light source is formed of curves that are each a combination of two curves, one being convex and the other concave toward a symmetry plane S.

While FIGS. 1 to 9 show examples of the light guide plate where the sectional shape of the back surface 18g of the portion that defines the parallel groove 18f is concave toward the symmetry plane S, it may be convex as typically shown in FIGS. 10 and 11. FIG. 10 shows a light guide plate 18 where the sectional shape of the back surface 18g of the portion that defines the parallel groove 18f is formed of two curves that are convex toward the symmetry plane S. FIG. 11 shows a light guide plate where the sectional shape of the back surface 18g of the portion that defines the parallel groove 18f is formed of curves that are each a combination of two curves, one being convex and the other concave toward the center of the parallel groove 18f. The back surfaces 18g of the portions that define the parallel grooves 18f shown in FIGS. 10 and 11 also contribute to emitting light with sufficient illuminance from the light exit surface while suppressing generation of bright lines.

In this way, according to the present invention, those portions of the sectional shape of the parallel groove in the light guide plate which correspond to the parallel groove may be formed of curves that are convex or concave toward the center of the parallel groove, or they may be formed of straight lines, or even a combination thereof may be used. Those curves are not limited to arcs of the illustrated example, but may be part of curves, for example, elliptical, parabolic, or hyperbolic curves that are convex or concave toward the symmetry plane S. Further, in the present invention, insofar as the sectional shape of the end portion of the parallel groove is tapered, the curves defining the parallel groove may be part of curves, such as circular, elliptical, parabolic, or hyperbolic curves that are convex or concave toward the center of the parallel groove.

Figure 12:
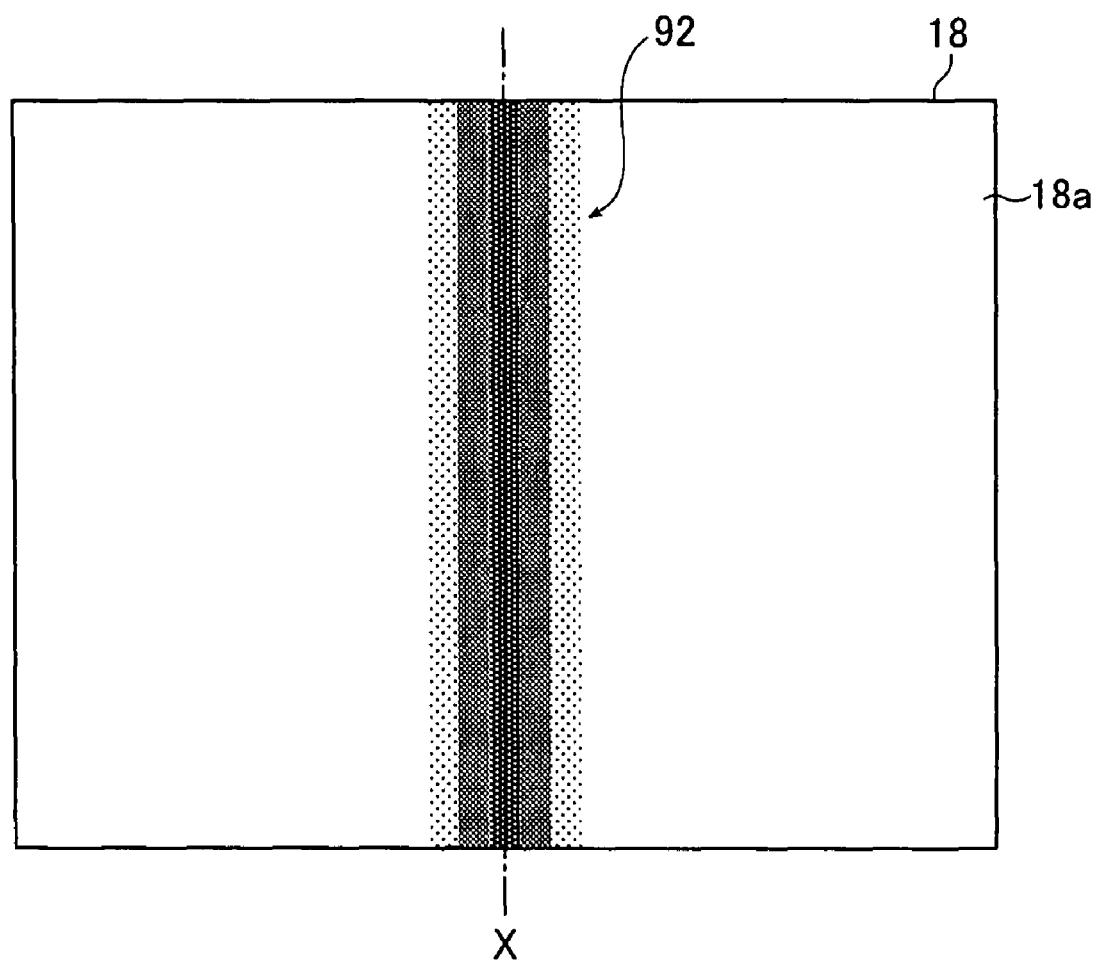
FIG. 12 shows an example of a half-dot pattern formed on a side of the light guide plate of the present invention which is closer to its light exit surface.

The light guide plate of the present invention may, as shown in FIG. 12, have a half-dot pattern 92 formed, typically by printing, on the light exit surface 18a of the light guide plate 18 in such a way that the density of dots is highest along a certain center line X and decreases progressively from that center line X toward either side (in a direction perpendicular to the center line). By forming this half-dot pattern 92 on the light exit surface 18a of the light guide plate 18 such that the center line X of the half-dot pattern coincides with the position corresponding to the symmetry plane of the light guide plate 18, the occurrence of bright lines or unevenness on the light exit surface 18a of the light guide plate 18 can be suppressed. In addition, printing of the half-dot pattern 92 on the light guide plate 18 may be replaced by overlying the light exit surface with a thin sheet having the half-dot pattern formed on it. The dots may be of any shape such as rectangular, circular or elliptical, and the density of dots can be chosen as appropriate for the intensity or spread of bright lines. In addition, instead of forming the half-dot pattern by printing, the area corresponding to the half-dot pattern may be roughened to produce a sand-rubbed surface. The sand-rubbed surface may be formed in the deepest portion or on sidewalls of the parallel groove in the light guide plate.

In addition, according to an observation of the present inventors, the light guide plate 18 shown in FIG. 3B wherein its back surface portion that defines the parallel groove 18f has a triangular (V-form) sectional shape (profile) has a low relative illuminance in the area directly above the light source 12, namely, in the central portion of the rectangular light exit surface 18a. In a case like this where the parallel groove has a triangular sectional shape, the illuminance across the light exit surface is preferably rendered uniform by shaping the apex (deepest portion) of the parallel groove either to be flat across a specified width or to have a curved surface with a comparatively small radius of curvature. In the present invention, by simply designing the light guide plate such that the deepest portion of the parallel groove will have the above-described sectional shape, the illuminance on the light exit surface of the light guide plate can be optimally adjusted to become uniform.

Now, it goes without saying that in the present invention, the sectional shape in the area where the back surfaces intersect with respect to the symmetry plane S, namely, the sectional shape of the end portion of the parallel groove may be in a level shape as obtained by chamfering or it may be not only a rounded circular shape but also an elliptical, parabolic, or hyperbolic shape as well. Further, in addition to this, the intersecting portion of interest may preferably be sand-rubbed, which contributes to reducing the peak value of illuminance or luminance on the light exit surface.

In addition, with the light guide plate of the present invention, it is preferred that either the sectional shape of the back surfaces of the light guide plate or the sectional shape of the portion that defines the parallel groove or both sectional shapes are adjusted such that the peak value of illuminance in its distribution across the light exit surface of the light guide plate is no more than three times, preferably no more than twice, the average value of illuminance. By thus setting the peak value of illuminance in its distribution across the light exit surface of the light guide plate to be no more than three times as the average value of illuminance, the illuminance distribution of the illuminating light emitted from the light exit surface of the light guide plate can be made more uniform than in the prior art. As a result, the illuminating light emitted from the light exit surface of the light guide plate need not be diffused (e.g. mixed) to a considerable degree and it becomes possible to use a low-cost diffuser sheet 14 which does not have a very high diffusion efficiency. It also becomes possible to reduce the number of diffuser sheets that must be used; in addition, the expensive prism sheets 16, 17 and 19 can be dispensed with. Alternatively, low-cost prism sheets 16, 17 and 19 that do not have very high diffusion efficiency can be used or fewer prism sheets can be used.

While the sectional shape (profile) of the back surfaces of the light guide plate of the present invention has been described hereinabove, a plurality of light guide plates 18 having back surfaces of the above-described shape can be coupled, with an end face of one plate being brought into intimate contact with the mating end face of an adjacent plate as shown in FIG. 1, thereby constructing coupled light guide plates that provide a larger light exit surface. With this light guide plate 18, the shape of its back surfaces can be designed as shown in FIG. 3B such that part of the light emitting from the cold-cathode tube 12 provided in the parallel groove 18f of the light guide plate 18 is reflected by the inclined surfaces 18b in the interior of that light guide plate and then it reaches an end face 18c of the light guide plate 18, from which it passes through an end face 18c of an adjacent light guide plate 18 connected to the first-mentioned end face 18c so that it is admitted into the second light guide plate 18. As a result, the incident light can be issued from the light exit surface 18a of the adjacently positioned light guide plate 18. By thus arranging a plurality of light guide plates 18 side by side such that all of their light exit surfaces define the same plane, even the light from the cold-cathode tube 12 provided in an adjacently positioned light guide plate 18 can be effectively utilized to enhance the efficiency of light emission. Still further, adapting the back surfaces 18b of the light guide plate 18 such that the slope at the connection to the associated end face 18c is zero offers such an advantage that, when a plurality of light guide plates 18 are coupled together as shown in FIG. 1, the generation of bright lines at the joints, or in those areas of the light exit surface 18a of the coupled light guide plates 18 which correspond to the end faces, can be suppressed more effectively.

In the next place, the diffuser sheet in the backlight unit 2 shown in FIGS. 2 and 3A is explained. The diffuser sheet 14 is used to ensure that the light emerging from the light exit surface 18a of the light guide plate 18 is diffused to become uniform. The diffuser sheet 14 is formed by imparting light diffusion property to a tabular member that is made of an optically transparent resin such as PET (polyethylene terephthalate), PP (polypropylene), PC (polycarbonate), PMMA (polymethyl methacrylate), benzyl methacrylate, MS resins, other acrylic resins, or COP (cycloolefin polymer), etc. The method of forming the diffuser sheet is not particularly limited, but the sheet may be formed by, for example, imparting the diffusion property through finely embossing, polishing or otherwise processing the surface of the above-mentioned tabular member to produce a roughened surface (hereinafter, the thus processed surface is referred to as "sand-rubbed surface"), or by coating the surface with light-scattering pigments such as silica, titanium oxide or zinc oxide, resins, or beads of glass or zirconium, together with a binder, or by kneading the aforementioned resin with the above-mentioned light-scattering pigments or beads. In the present invention, the diffuser sheet 14 may be of a matted or coated type.

In the present invention, the diffuser sheet 14 is preferably a film of member in a thickness of 500 μm or less that is made of any of the above-mentioned materials and which has been provided with the light diffusion property.

In addition, the diffuser sheet 14 is preferably spaced by a predetermined distance from the light exit surface 18a of the light guide plate 18 and this distance can be varied as appropriate for the distribution of light quantity from the light exit surface 18a of the light guide plate 18. By thus spacing the diffuser sheet 14 from the light exit surface 18a of the light guide plate 18 by a predetermined distance, the light emitting from the light exit surface 18a of the light guide plate 18 is subjected to further mixing between the light exit surface 18a and the diffuser sheet 14. As a result, the illuminance of the light illuminating the liquid crystal display panel 3 after passing through the diffuser sheet 14 can be rendered even more uniform. An example of the method of spacing the diffuser sheet 14 from the light exit surface 18a of the light guide plate 18 by a predetermined distance is by providing a spacer between the diffuser sheet 14 and the light guide plate 18.

Particularly in the case where the backlight unit 2 can be made a little thicker, there is no need to rely upon the sectional shape of the parallel groove 18f in the light guide plate 18 for adequately reducing the peak value of illuminance on the light exit surface 18a of the light guide plate 18 in the area that corresponds to the parallel groove 18f but it may be partly reduced while, at the same time, a gap is provided between the diffuser sheet 14 and the light exit surface 18a of the light guide plate 18 so that the illuminating light issued from the diffuser sheet 14 is rendered to have a uniform illuminance distribution. Also in the case where there is a limit to the effort for improving the sectional shape of the parallel groove 18f in the light guide plate 18 (i.e., tapering the end portion of the parallel groove) and the peak value of illuminance on the light exit surface 18a of the light guide plate 18 in the area that corresponds to the parallel groove 18f cannot be reduced completely or even adequately, a gap may be provided between the diffuser sheet 14 and the light exit surface 18a of the light guide plate 18 so that the illuminating light issued from the diffuser sheet 14 is rendered to have a uniform illuminance distribution.

To be described next are the prism sheets in the backlight unit shown in FIGS. 2 and 3A. Prism sheets 16 and 17 are each a transparent sheet formed by arranging plural prisms in parallel and they can enhance the condensing property of light emitted from the light exit surface 18a of the light guide plate 18 to provide improved luminance. Prism sheets 16 and 17 are provided such that the prism array of one prism sheet extends parallel to the parallel groove 18f in the light guide plate 18 whereas that of the other prism sheet extends perpendicularly. In other words, prism sheets 16 and 17 are arranged such that their prism arrays extend in directions that are perpendicular to each other. In addition, the prism sheet 16 is provided such that the vertex of each prism faces the light exit surface 18a of the light guide plate 18. Here, the order of arranging prism sheets 16 and 17 may be such that prism sheet 16 having prisms that extend in a direction parallel to the parallel groove in the light guide plate is provided immediately above the light guide plate and that the prism sheet having prisms that extend in a direction perpendicular to the parallel groove 18f in the light guide plate 18 is provided on top of the prism sheet 16; the order of arrangement of the two prism sheets may be reversed.

In the illustrated case, prism sheets are used but they may be replaced by sheets on which optical elements like prisms are regularly arranged. In addition, sheets on which elements having a lens effect, for example, lenticulated lenses, concave lenses, convex lenses, or optical elements in pyramidal shape are regularly arranged may be substituted for the prism sheets.

Figure 13A:
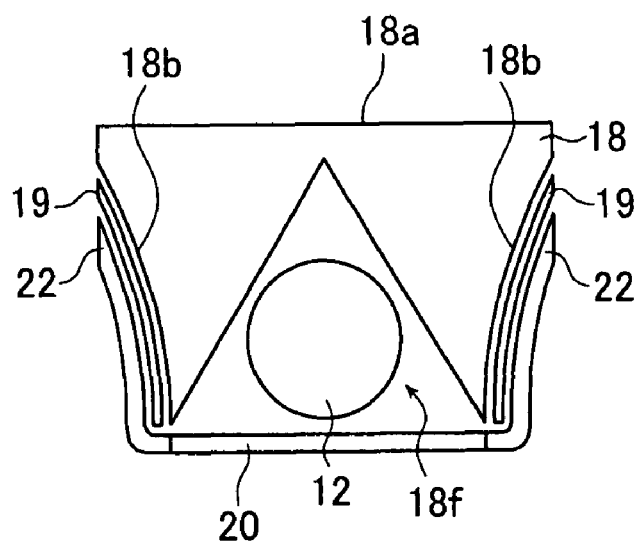
FIG. 13A is a diagrammatic partial sectional view showing an embodiment of the planar lighting device of the present invention in which a prism sheet is provided between a reflective sheet and the inclined surfaces of the light guide plate.
Figure 13B:
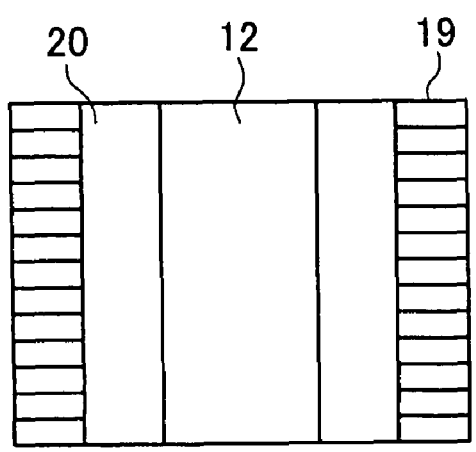
FIGS. 13B and 13C are a diagrammatic plan view and a diagrammatic cross-sectional view, respectively, of the prism sheet of FIG. 13A as it is seen from the light guide plate.
Figure 13C:
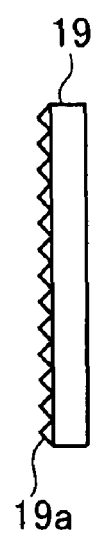

Further in the present invention, as FIGS. 13A, 13B and 13C show, it is preferable to interpose an additional prism sheet 19 between the reflective sheet 22 and each of the back surfaces 18b. FIG. 13A is a diagrammatic sectional view showing how the prism sheet 19 is provided between the reflective sheet 22 and each of the back surfaces 18b of the light guide plate 18; FIGS. 13B and 13C are a diagrammatic plan view and a diagrammatic cross-sectional view, respectively, which show the prism sheet 19 interposed between the reflective sheet 22 and each of the back surfaces 18b of the light guide plate 18 as seen from the light guide plate. The prism sheet 19 interposed between the reflective sheet 22 and each of the back surfaces 18b of the light guide plate 18 is preferably provided such that prisms 19a extend in a direction perpendicular to the parallel groove 18f in the light guide plate 18 and that the vertex of each prism 19a faces the back surfaces 18b of the light guide plate 18.

Here, the prism sheet is used but there may be used an optical element having a similar effect to the prism sheet; for example, a sheet on which optical elements having the lens effect such as lenticulated lenses, concave lenses, convex lenses, or optical elements in pyramidal shape are regularly arranged may be provided.

In the illustrated case, prism sheets 16 and 17 are used, preferably in combination with prism sheet 19, but it should be noted here that if the illuminance on the light exit surface 18a as achieved by the parallel groove 18f in the light guide plate 18 is made more uniform than others, prism sheet 19 is of course unnecessary, and what is more, either prism sheet 16 or 17 or both may be dispensed with. Using a smaller number of expensive prism sheets or dispensing with all prism sheets contributes to reducing the equipment cost.

To be described next is the reflective sheet 22 in the backlight unit 2 shown in FIGS. 2 and 3A. In FIGS. 2 and 3A, reflective sheet 22 is used for reflecting light leaking from the back surface (the underside in the Figures) of the light guide plate 18 so that it will be admitted again into the light guide plate 18, thereby improving the utilization of light. The reflective sheet 22 is so formed as to cover the underside (inclined surface) of the light guide plate 18. The reflector 20 is provided behind the light source 12 in such a way as to close the parallel groove 18f in the light guide plate 18. The reflector 20 reflects the light from the underside of the light source 12 so that it can be admitted into the light guide plate 18 through sidewall surfaces of the parallel groove 18f.

The reflective sheet 22 may be formed of any material that is capable of reflecting the light leaking from the back surface (the underside in the drawings) of the light guide plate 18. Exemplary materials that can be used to form the sheet include: a resin sheet whose reflectivity has been enhanced by kneading PET, PP (polypropylene), etc. with a filler and then drawing the resultant mixture to thereby form voids; a sheet obtained by depositing aluminum vapor or otherwise forming a specular surface on the surface of a transparent resin sheet or a white resin sheet of the type described above; a metal foil such as an aluminum foil or a resin sheet carrying the metal foil; and a metal thin plate having sufficient reflective property on the surface. In addition, the reflector 20 can also be formed of the same materials as the above-described reflective sheet, namely, resin materials, metal foils or metal plates that have been provided with sufficient reflective property on the surface.

Thus, the light guide plate of the present invention, as well as the planar lighting device and the liquid crystal display apparatus that use the same have been described on the foregoing pages.

In the next step, the present inventors coupled a plurality of the light guide plates of the present invention to construct coupled light guide plate or a light guide plate assembly and investigated the luminance distribution on the light exit surface by simulation. FIG. 14 shows a graph for the luminance distribution as obtained by simulation. The investigation was directed to the case of coupling three light guide plates and the sectional shape of the back surfaces of each light guide plate was a curved shape (shape 1) that was expressed by a 10th degree function specified by the coefficients ($A_0$ to $A_{10}$) shown in Table 1 below. The aforementioned FIG. 4 shows a graph that satisfies this function formula. In FIG. 4, the horizontal axis X plots the position from the origin O in a direction parallel to the side 18h of the light guide plate 18 shown in FIG. 3B, and the vertical axis Y plots the position from the origin O in a direction perpendicular to the side 18h of the light guide plate 18. In the measurement of luminance, the light guide plates were assumed to have a maximum thickness of 5.5 mm, the light sources a diameter of 2 mm, and each light guide plate a width of 30 mm. The structural design for which the simulation was made is shown in FIG. 3A, where the light guide plate 18 has the reflective sheet 22 and the reflector 20 provided on the back surfaces 18b.

TABLE 1

|  | Shape 1 | Shape 2 | Shape 3 |
|---|---|---|---|
| Average value | 6720.89130869565 | 7171.08071086957 | 4523.71736304348 |
| Maximum value | 8719.9619 | 8706.1621 | 5754.1377 |
| Minimum value | 2780.1821 | 3055.429 | 1081.4495 |
| Max val./av. val. | 1.297441292 | 1.214065557 | 1.271993195 |

Figure 15:
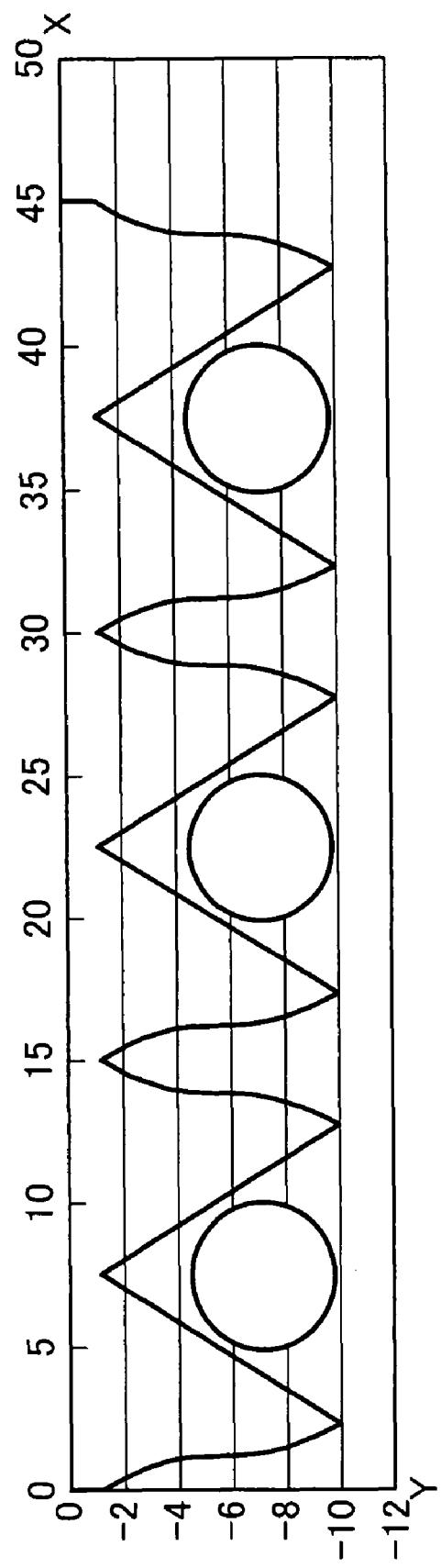
FIG. 15 is a graph that is different from the graph of FIG. 4 and which shows another example of the 10th degree function formula which expresses a sectional profile of the back surfaces of the light guide plate of the present invention.
Figure 16:
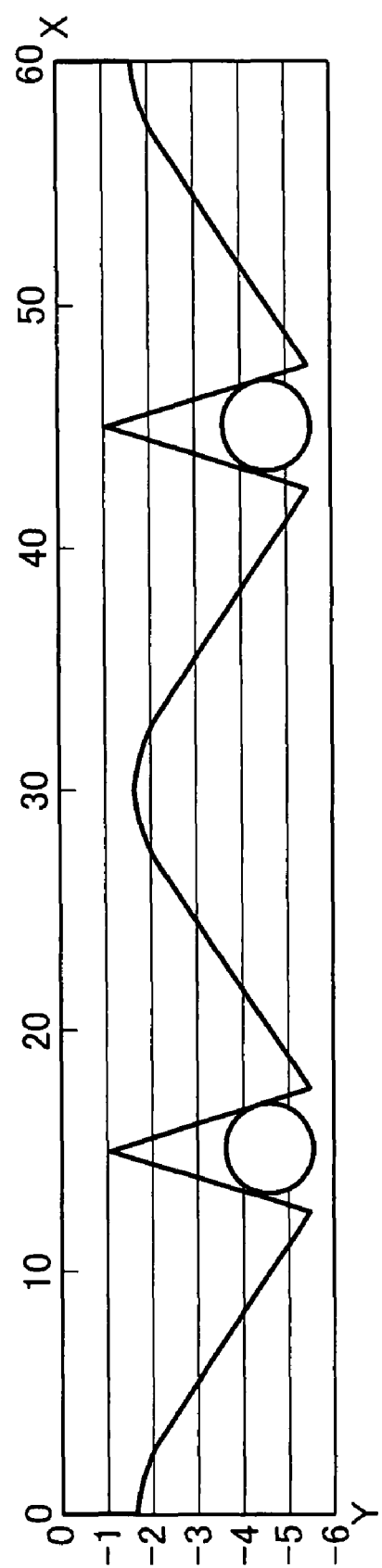
FIG. 16 is a graph that is different from the graphs of FIGS. 4 and 15 and which shows another example of the 10th degree function formula which expresses a sectional profile of the back surfaces of the light guide plate of the present invention.
Figure 17:
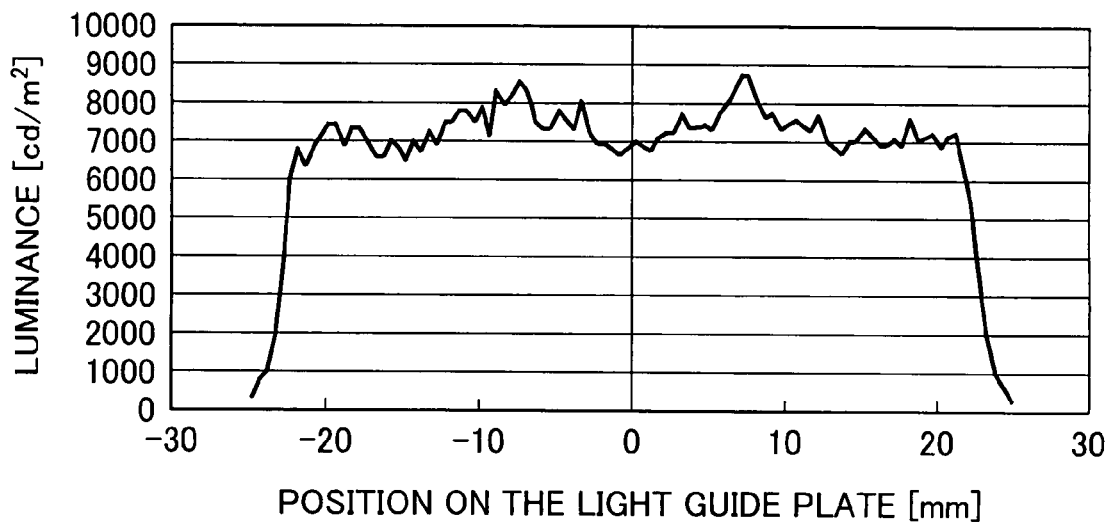
FIG. 17 is a graph showing an exemplary luminance distribution on the light exit surface that is obtained when three light guide plates having the shape of back surfaces shown in the graph of FIG. 15 are coupled together.
Figure 18:
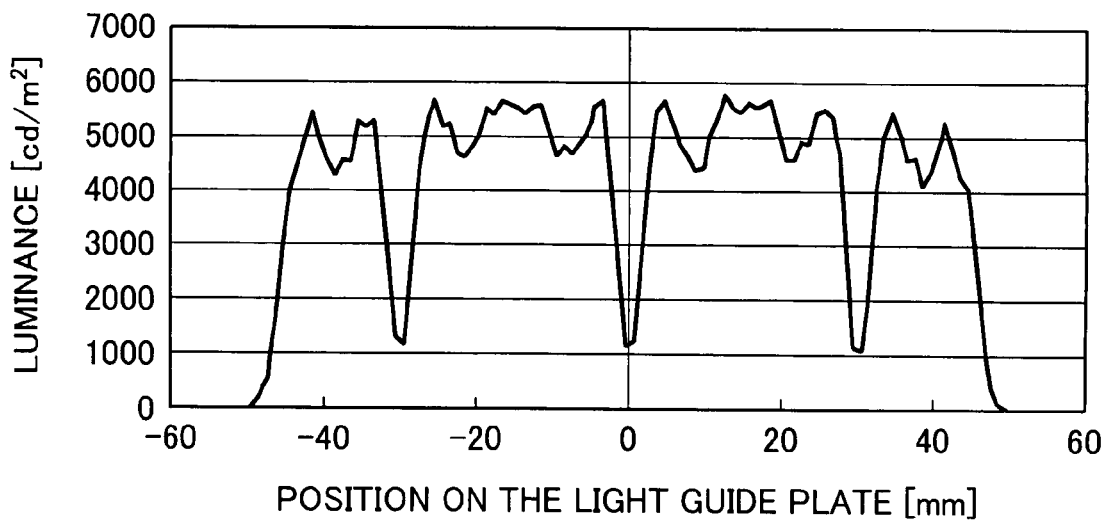
FIG. 18 is a graph showing an exemplary luminance distribution on the light exit surface that is obtained when three light guide plates having the shape of back surfaces shown in the graph of FIG. 16 are coupled together.

Light guide plates were constructed such that the shapes of back surfaces were expressed by 10th degree functions that were specified by the coefficients $A_0$ to $A_{10}$ indicated for shapes 2 and 3 in Table 1 above, and their luminance distributions on the light exit surfaces were also investigated by simulation. The curves of the 10th degree functions for shapes 2 and 3 are shown in FIGS. 15 and 16, respectively. The luminance distributions of the light guide plates with shapes 2 and 3 are shown in FIGS. 17 and 18, respectively.

The light guide plates having the shapes of back surfaces for shapes 1 to 3 were determined for the luminance on their light exit surface in terms of its average value, maximum value, minimum value, and the ratio of the maximum value to the average value (max val./av. val.), and the results are shown in Table 2 below.

TABLE 2

| Coefficients | Shape 1 | Shape 2 | Shape 3 |
|---|---|---|---|
| $A_0$ | −1.21E+05 | 2.35E+05 | −1.64E+00 |
| $A_1$ | 9.34E+04 | −1.94E+05 | 3.04E−02 |
| $A_2$ | −2.53E+04 | 5.65E+04 | −1.48E−01 |
| $A_3$ | 2.15E+03 | −5.43E+03 | 1.18E−01 |
| $A_4$ | 1.03E+02 | −2.09E+02 | −6.92E−02 |
| $A_5$ | 2.16E+01 | −3.62E+01 | 2.18E−02 |
| $A_6$ | −1.40E+01 | 3.22E+01 | −3.99E−03 |
| $A_7$ | 1.41E+00 | −3.52E+00 | 4.40E−04 |
| $A_8$ | 3.30E−02 | −7.74E−02 | −2.91E−05 |
| $A_9$ | −1.18E−02 | 3.15E−02 | 1.06E−06 |
| $A_{10}$ | 4.87E−04 | −1.36E−03 | −1.65E−08 |

Figure 19:
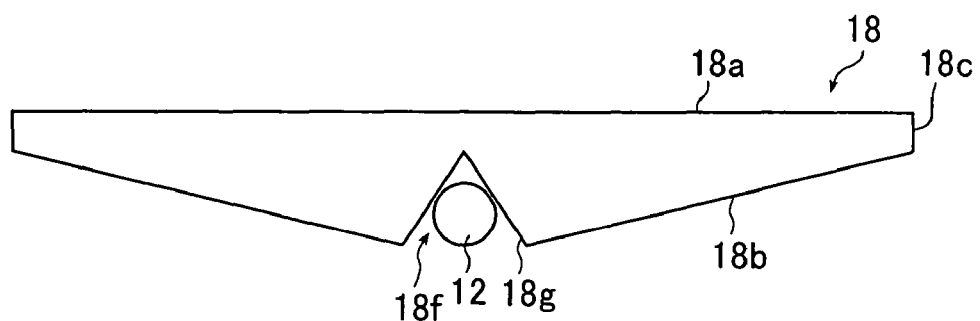
FIG. 19 is a diagrammatic sectional view showing another embodiment of the light guide plate of the present invention, in which the sectional shape of its back surfaces is formed of straight lines inclined with respect to the light exit surface and the parallel groove for accommodating the light source is of a triangular shape.
Figure 20:
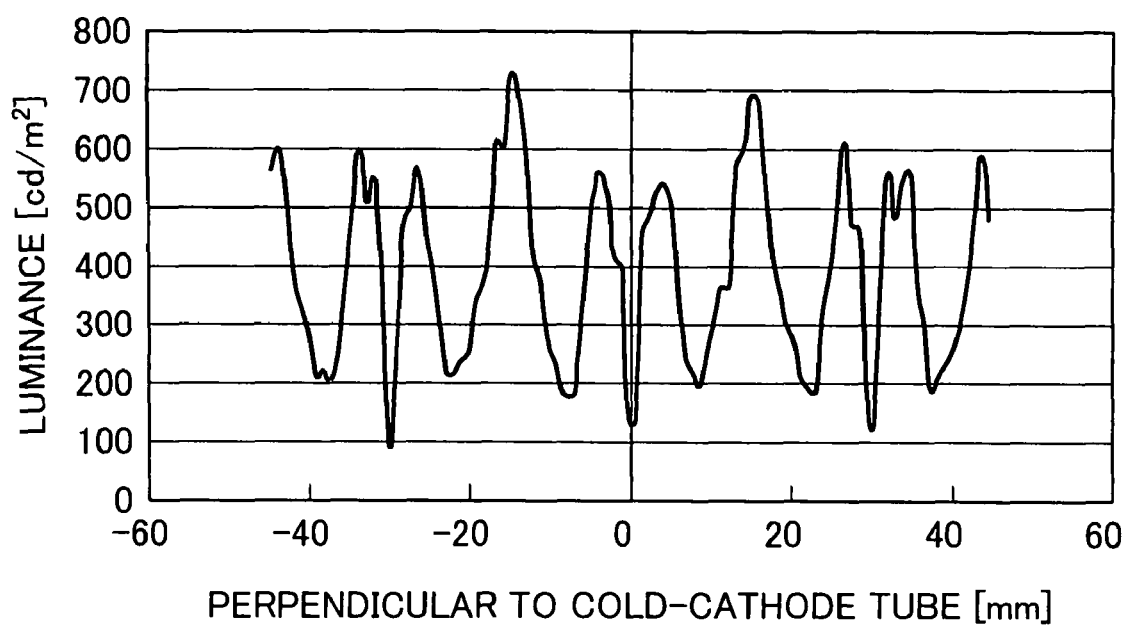
FIG. 20 is a graph showing an exemplary luminance distribution on the light exit surface that is obtained when three light guide plates having the shape shown in the graph of FIG. 19 are coupled together.

As a reference, a light guide plate having the back surface shaped as shown in FIG. 19 was constructed and the luminance distribution on its light exit surface was also investigated by simulation. The luminance distribution obtained by the simulation is shown in FIG. 20. The sectional shape of the back surface 18b of the light guide plate 18 was such that it formed a straight line inclined with respect to the light exit surface 18a as shown in FIG. 19; the light source was assumed to have a diameter of 3 mm, the light guide plate 18 a maximum thickness of 5.5 mm, and the light guide plate a thickness of 2.75 mm at the farthest end portions. The parallel groove for accommodating the light source was assumed to have a sectional shape in the form of an equilateral triangle. Under these conditions, the luminance on the light exit surface of the light guide plate was measured by performing simulation in the same manner as described above.

As can be seen from the graphs of luminance distribution shown in FIGS. 14, 17, 18 and 20, the light guide plates of the present invention having shapes 1 to 3 had smaller gaps between the maxima and minima in luminance on the light exit surface than the light guide plate shown in FIG. 19. In other words, one can see that the unevenness of luminance on the light exit surface was suppressed. In particular, as those graphs for luminance distribution show, the luminance fluctuates by smaller degrees at the joints between light guide plates (X=±15 mm), thus achieving uniformity in the luminance across the light exit surface. This is also clear from Table 2, in which the light guide plates of shapes 1 to 3 are equally shown to have smaller ratios of the maximum value to the average value. In particular, the light guide plate of shape 2 not only had a high average value of luminance but also showed a uniform luminance distribution, with the result that the light guide plate maintained high luminance while exhibiting reduced unevenness in luminance.

Thus, it can be seen that the light guide plate of the present invention has such an advantage that when a plurality of such light guide plates are coupled to construct coupled light guide plates, the luminance on the light exit surface can be rendered uniform while, at the same time, suppressing the generation of bright lines at the joints of the coupled light guide plates.

Here, simulation-based calculations were conducted on the assumption that the light guide plate was 30 mm wide; it should, however, be noted that in the present invention, the width of the light guide plate can be changed in accordance with use. In this case, it suffices for the sectional shape of the back surfaces of the light guide plate to be so designed as to satisfy the aforementioned 10th degree function formula (1); alternatively, they may assume shapes similar to the graphs in FIGS. 4, 15 and 16.

By arranging a plurality of the light guide plates of the present invention side by side and coupling them to make coupled light guide plates, one can construct a backlight unit having a larger-sized light irradiating surface such that the luminous flux emitting from the light exit surface provides a uniform distribution of light quantity and the generation of bright lines is suppressed. This backlight unit having a larger-sized light irradiating surface can be applied to liquid crystal display apparatuses having a large-sized display screen and, in particular, it is best suited to a liquid crystal display apparatus of a wall-hung type as exemplified by a wall-hung TV set.

While the light guide plate of the present invention, as well as the backlight unit and the liquid crystal display apparatus that are provided with this light guide plate have been described above in detail, the present invention is by no means limited to the above embodiments and various improvements and changes may of course be made without departing from the gist of the present invention.

For example, the foregoing examples have been explained with reference to a mode in which the light guide plates of the present invention are coupled monolithically to form a lager light guide plate (coupled light guide plates); alternatively, the light guide plates of the present invention may be prepared as single independent units, which are coupled together to form a larger light guide plate (coupled light guide plates or a light guide plate assembly). From a viewpoint of production efficiency, it is preferred that as many light guide plates of the present invention as are necessary to form a light guide plate whose size is equivalent to the required screen size are molded, with them being coupled monolithically. By adopting this structural design, one can construct a backlight unit which, by means of a single light guide plate, has a larger-sized light irradiating surface such that the luminous flux emitting from the light exit surface provides a uniform distribution of light quantity and that the generation of bright lines is suppressed. In addition, these coupled light guide plates which are characterized by a plurality of light guide plates that have been molded, with them being coupled monolithically, can be easily manufactured by, for example, extrusion molding.

In the case where a plurality of independent light guide plates having the structure shown in FIG. 3B are coupled together to form coupled light guide plates (a light guide plate assembly), light passing from an end face portion of one light guide plate toward another light guide may potentially scatter or experience other unwanted phenomena. However, with the coupled light guide plates which are characterized by a plurality of light guide plates that have been molded, with them being coupled monolithically, no such light scattering occurs at those end face portions and, hence, the utilization of light from light sources can be further enhanced.

Figure 21A:
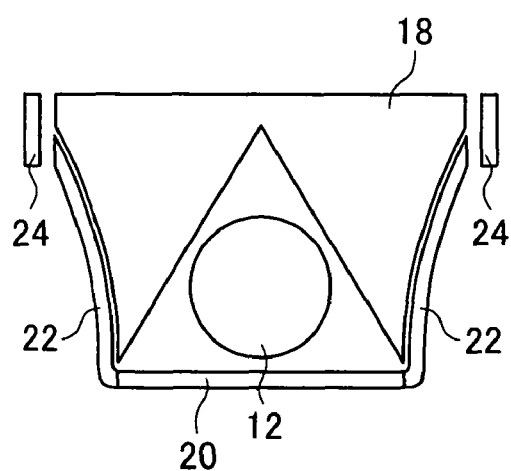
FIG. 21A is a diagrammatic partial sectional view showing an exemplary structural design in which a reflective plate is provided on both end faces of the light guide plate in the planar lighting device of the present invention.
Figure 21B:
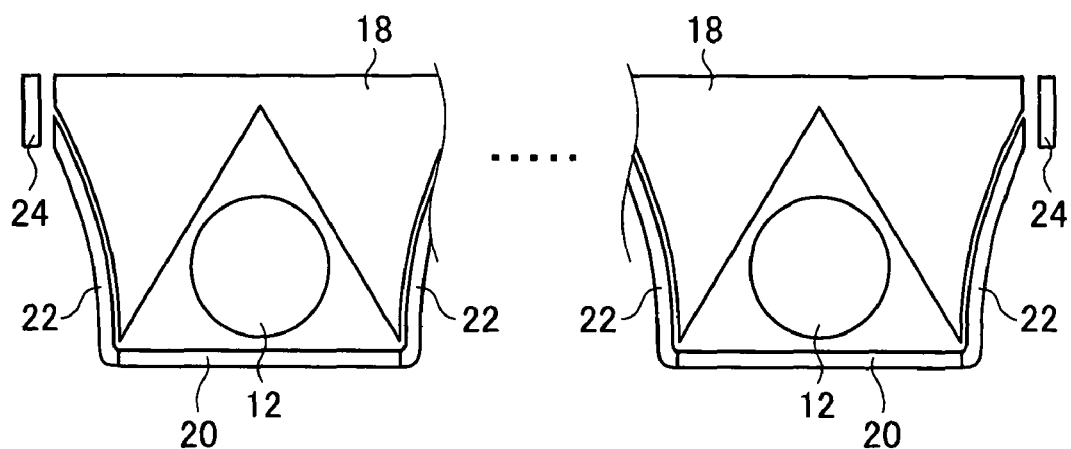
FIG. 21B is a diagrammatic partial sectional view showing an exemplary structural design in which a reflective plate is provided on both end faces of a light guide plate assembly constructed by arranging side by side a plurality of the light guide plates in the planar lighting device of the present invention.
Figure 23:
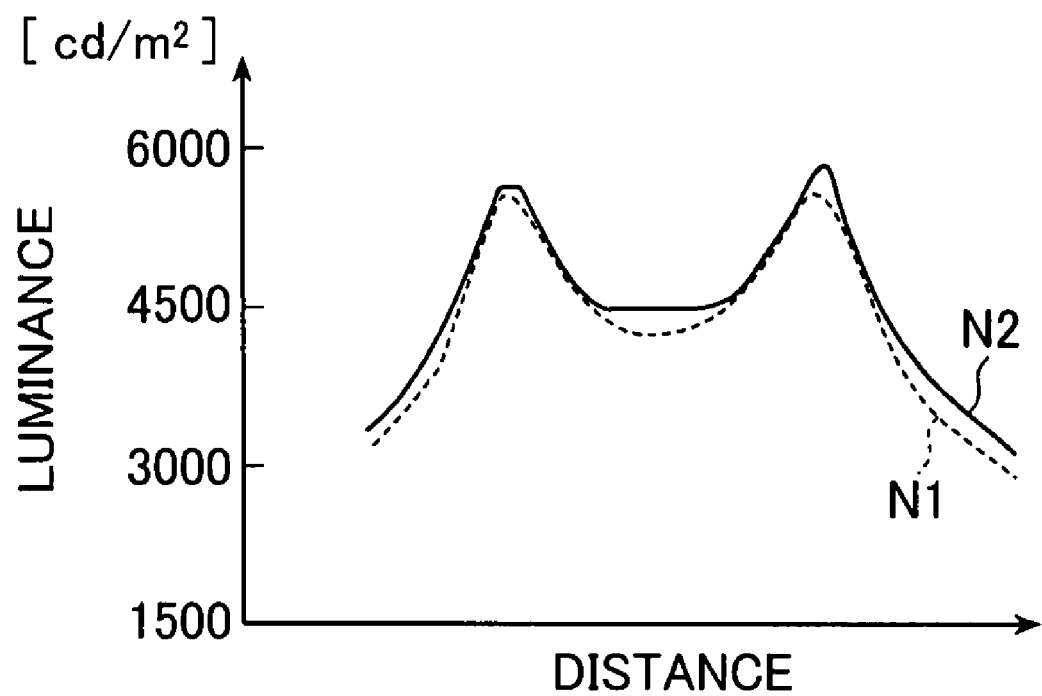
FIG. 23 is a luminance graph for the exit surface of the light guide plate in the area light source device shown in FIG. 21.

In addition, with the light guide plate of the present invention, one may, as shown in FIG. 21A, provide a reflective plate 24 at end faces of the light guide plate 18 considering such factors as the area of end faces. As already mentioned, in the case of providing a plurality of light guide plates 18 to make coupled light guide plates (a light guide plate assembly), one need only provide the reflective plates 24 on lateral faces of the light guide plates 18 provided on the outermost sides, as shown in FIG. 21B. The reflective plates 24 provided on those lateral faces contribute to preventing the leakage of light from end faces of the light guide plates 24 and, hence, the utilization of light can be furthermore enhanced. The reflective plates 24 can be formed of the same materials as the aforementioned reflective sheet and reflector.

The invention claimed is:

1. A transparent light guide plate, comprising:
   a rectangular light exit surface that constitutes a front portion; and
   back surfaces that constitute a back portion and which have a shape symmetrical with respect to a symmetry plane that includes a center of said light exit surface and which is perpendicular to one side of said light exit surface,
   wherein said back surfaces have such a sectional profile that when a section of said light guide plate is taken through a plane that is parallel to said one side and which is perpendicular to said light exit surface and when a point at which an end face of said light guide plate is connected to one of said back surfaces is designated an origin, a position from said origin in a direction parallel to said one side is written as X, and a position from said origin in a direction perpendicular to said one side is written as Y, said sectional shape of each of said back surfaces is expressed by part of a curve that satisfies the following $10^{th}$-order function formula:

$$Y = A_0 + A_1 \times X + A_2 \times X^2 + A_3 \times X^3 + A_4 \times X^4 + A_5 \times X^5 + A_6 \times X^6 + A_7 \times X^7 + A_8 \times X^8 + A_9 \times X^9 + A_{10} \times X^{10}$$

$$-1.3 \times 10^5 \leq A_0 \leq 2.4 \times 10^5,$$

$$-2.0 \times 10^4 \leq A_1 \leq 9.4 \times 10^4,$$

$$-2.6 \times 10^4 \leq A_2 \leq 5.7 \times 10^4,$$

$$-5.5 \times 10^3 \leq A_3 \leq 2.2 \times 10^3,$$

$$-2.1 \times 10^2 \leq A_4 \leq 1.1 \times 10^2,$$

$$-3.7 \times 10 \leq A_5 \leq 2.2 \times 10,$$

$$-1.4 \times 10 \leq A_6 \leq 3.3 \times 10,$$

$$-3.6 \leq A_7 \leq 1.5,$$

$$-7.8 \times 10^{-2} \leq A_8 \leq 3.3 \times 10^{-2},$$

$$-1.2 \times 10^{-2} \leq A_9 \leq 3.2 \times 10^{-2},$$

$$-1.4 \times 10^{-3} \leq A_{10} \leq 4.9 \times 10^{-4}.$$

2. The light guide plate according to claim 1, wherein each of thickest portions where said light guide plate has a maximum thickness is formed between said symmetry plane and each end face of said light guide plate, and a parallel groove that tapers toward said light exit surface and which extends parallel to said symmetry plane is defined by said back surfaces that are located between said symmetry plane and said thickest portions and which are symmetrical with respect to said symmetry plane.

3. The light guide plate according to claim 2, wherein said parallel groove is a groove for accommodating a rod of light source.

4. The light guide plate according to claim 3, wherein, when said rod of light source having a radius of r is accommodated in said parallel groove and if a shortest distance from a center of said rod of light source to said light guide plate is written as t, and a shortest distance, as measured in a depth direction of said light guide plate, from a plane that contacts a pair of the thickest portions to said center of the rod of light source is written as ΔH, said light guide plate satisfies $t \geq r$, and $\Delta H \geq r$.

5. The light guide plate according to claim 2, wherein said sectional shape of said back surfaces is such that a curve by which a point of intersection between said curve forming one of said back surfaces and said symmetry plane is connected to one point located between said point of intersection and each of said thickest portions is approximated by a straight line passing through those two points.

6. The light guide plate according to claim 2, wherein said sectional shape of said back surfaces is such that a curve by which a point of intersection between said curve forming one of said back surfaces and said symmetry plane is connected to one point located between said point of intersection and each of said thickest portions is approximated by either a circular, elliptical, parabolic, or a hyperbolic curve.

7. The light guide plate according to claim 1, wherein said 10th-order function is a function that has a slope of zero at said origin.

8. The light guide plate according to claim 1, wherein said 10th-order function has one minimum value between a position of said symmetry plane and said origin.

9. The light guide plate according to claim 1, wherein coefficients in said 10th-order function are so determined that each of said thickest portions where said light guide plate has a maximum thickness is formed between said symmetry plane and each of said end faces, as well as a thickness of said light guide plate gradually decreases from each of thickest portions toward each of said end faces.

10. A light guide plate comprising a plurality of said light guide plates according to claim 1, with mating end faces being coupled to each other.

11. A light guide plate having such a structure that a plurality of said light guide plates according to claim 1 are arranged side by side and monolithically, with mating end faces being coupled to each other.

12. A planar lighting device, comprising:
a light guide plate, comprising;
a rectangular light exit surface that constitutes a front portion;
back surfaces that constitute a back portion and which have a shape symmetrical with respect to a symmetry plane that includes a center of said light exit surface and which is perpendicular to one side of said light exit surface;
thickest portions where said light guide plate have a maximum thickness, each being formed between said symmetry plane and each end face of said light guide plate; and
a parallel groove that tapers toward said light exit surface and which extends parallel to said symmetry plane, and said thickest portions and which are symmetrical with respect to said symmetry plane;
a rod of light source accommodated in said parallel groove of said light guide plate;
a reflector provided behind said rod of light source in such a way as to close said parallel groove;
a reflective sheet fitted on said back surfaces of said light guide plate in an area between each of said end faces and each of said thickest portions; and
a diffuser sheet provided on said rectangular light exit surface of said light guide plate,
wherein said back surfaces have such a sectional profile that when a section of said light guide plate is taken through a plane that is parallel to said one side and which is perpendicular to said light exit surface and when a point at which an end face of said light guide plate is connected to one of said back surfaces is designated an origin, a position from said origin in a direction parallel to said one side is written as X, and a position from said origin in a direction perpendicular to said one side is written as Y, said sectional shape of each of said back surfaces is expressed by part of a curve that satisfies the following 10th-order function formula:

$Y = A_0 + A_1 \times X + A_2 \times X^2 + A_3 \times X^3 + A_4 \times X^4 + A_5 \times X^5 + A_6 \times X^6 + A_7 \times X^7 + A_8 \times X^8 + A_9 \times X^9 + A_{10} \times X^{10}$ $-1.3 \times 10^5 \leq A_0 \leq 2.4 \times 10^5$, $-2.0 \times 10^4 \leq A_1 \leq 9.4 \times 10^4$, $-2.6 \times 10^4 \leq A_2 \leq 5.7 \times 10^4$, $-5.5 \times 10^3 \leq A_3 \leq 2.2 \times 10^3$, $-2.1 \times 10^2 \leq A_4 \leq 1.1 \times 10^2$, $-3.7 \times 10 \leq A_5 \leq 2.2 \times 10$, $-1.4 \times 10 \leq A_6 \leq 3.3 \times 10$, $-3.6 \leq A_7 \leq 1.5$, $-7.8 \times 10^{-2} \leq A_8 \leq 3.3 \times 10^{-2}$, $-1.2 \times 10^{-2} \leq A_9 \leq 3.2 \times 10^{-2}$, $-1.4 \times 10^{-3} \leq A_{10} \leq 4.9 \times 10^{-4}$.

13. The planar lighting device according to claim 12, which further includes a prism sheet provided between said rectangular light exit surface of said light guide plate and said diffuser sheet.

14. A liquid crystal display apparatus, comprising:
a backlight unit comprising a planar lighting device;
a liquid crystal display panel provided on a side of said backlight unit which is closer to its light exit surface; and
a drive unit for driving said backlight unit and said liquid crystal display panel,
wherein said planar lighting device, comprising:
a light guide plate comprising:
a rectangular light exit surface that constitutes a front portion;
back surfaces that constitute a back portion and which have a shape symmetrical with respect to a symmetry plane that includes a center of said light exit surface and which is perpendicular to one side of said light exit surface;
thickest portions where said light guide plate have a maximum thickness each being formed between said symmetry plane and each end face of said light guide plate; and
a parallel groove that tapers toward said light exit surface and which extends parallel to said symmetry plane, said parallel groove being defined by said back surfaces that are located between said symmetry plane and said thickest portions and which are symmetrical with respect to said symmetry plane;

a rod of light source accommodated in said parallel groove of said light guide plate;

a reflector provided behind said rod of light source in such a way as to close said parallel groove;

a reflective sheet fitted on said back surfaces of said light guide plate in an area between each of said end faces and each of said thickest portions; and a diffuser sheet provided on said rectangular light exit surface of said light guide plate, wherein said back surfaces have such a sectional profile that when a section of said light guide plate is taken through a plane that is parallel to said one side and which is perpendicular to said light exit surface and when a point at which an end face of said light guide is connected to one of said back surfaces is designated an origin, a position from said origin in a direction parallel to said one side is written as X, and a position from said origin in a direction perpendicular to said one side is written as Y, said sectional shape of each of said back surfaces is expressed by part of a curve that satisfies the following 10th-order function formula:

$$Y = A_0 + A_1 \times X + A_2 \times X^2 + A_3 \times X^3 + A_4 \times X^4 + A_5 \times X^5 + A_6 \times X^6 + A_7 \times X^7 + A_8 \times X^8 + A_9 \times X^9 + A_{10} \times X^{10}$$

$-1.3 \times 10^5 \leq A_0 \leq 2.4 \times 10^5$, $-2.0 \times 10^4 \leq A_1 \leq 9.4 \times 10^4$, $-2.6 \times 10^4 \leq A_2 \leq 5.7 \times 10^4$, $-5.5 \times 10^3 \leq A_3 \leq 2.2 \times 10^3$, $-2.1 \times 10^2 \leq A_4 \leq 1.1 \times 10^2$, $-3.7 \times 10 \leq A_5 \leq 2.2 \times 10$, $-1.4 \times 10 \leq A_6 \leq 3.3 \times 10$, $-3.6 \leq A_7 \leq 1.5$, $-7.8 \times 10^{-2} \leq A_8 \leq 3.3 \times 10^{-2}$, $-1.2 \times 10^{-2} \leq A_9 \leq 3.2 \times 10^{-2}$, $-1.4 \times 10^{-3} \leq A_{10} \leq 4.9 \times 10^{-4}$.

* * * * *